(12) United States Patent  
Uchida et al.

(10) Patent No.: US 6,208,807 B1  
(45) Date of Patent: Mar. 27, 2001

(54) METHOD AND APPARATUS FOR DISASSEMBLING LENS-FITTED PHOTO FILM UNIT

(75) Inventors: Shoichi Uchida; Masaya Morita, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/238,788

(22) Filed: Jan. 27, 1999

(30) Foreign Application Priority Data

Jan. 28, 1998 (JP) .................................................. 10-015476

(51) Int. Cl.⁷ ............................ G03B 17/02; G03B 29/00
(52) U.S. Cl. ................................................. 396/6; 396/429
(58) Field of Search .......................................... 396/6, 429

(56) References Cited

U.S. PATENT DOCUMENTS

| 5,436,685 | 7/1995 | Yamashina ........................... 396/439 |
| 5,615,395 | 3/1997 | Komaki et al. ......................... 396/6 |
| 5,646,712 | * 7/1997 | Solomon et al. ..................... 396/535 |
| 5,655,155 | * 8/1997 | Bergstresser et al. .................. 396/6 |
| 6,035,127 | * 3/2000 | Takaba et al. ........................... 396/6 |

FOREIGN PATENT DOCUMENTS 8-328205   12/1996  (JP) .

* cited by examiner

*Primary Examiner*—David M. Gray  
(74) *Attorney, Agent, or Firm*—Sughrue, Mion, Zinn, Macpeak & Seas, PLLC

(57) ABSTRACT

A lens-fitted photo film unit includes a main body preloaded with photo film. A front cover covers a front of the main body. A rear cover covers a rear of the main body. A retainer mechanism has a retainer claw and a receiver portion engaged with each other, for connecting rear walls of the main body and the rear cover. An opening is formed in the rear cover, for uncovering at least a portion of the retainer claw or the receiver portion. For disassembly, a release claw is inserted into the opening by setting the lens-fitted photo film unit in a cover separating station with the rear cover directed downwards. The release claw is disposed to protrude upwards in the cover separating station. The release claw is shifted relative to the opening, to disengage the retainer claw from the receiver portion by flexing the retainer claw away therefrom. After disengaging the retainer claw from the receiver portion, the main body is moved away from the rear cover.

40 Claims, 18 Drawing Sheets

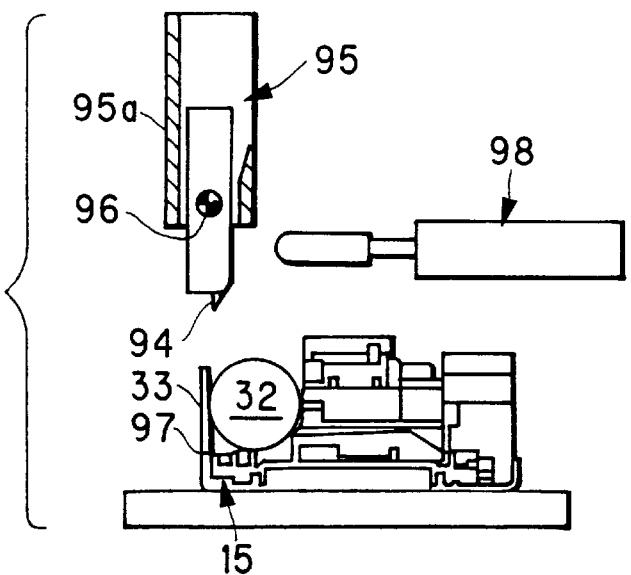
F I G. 13A
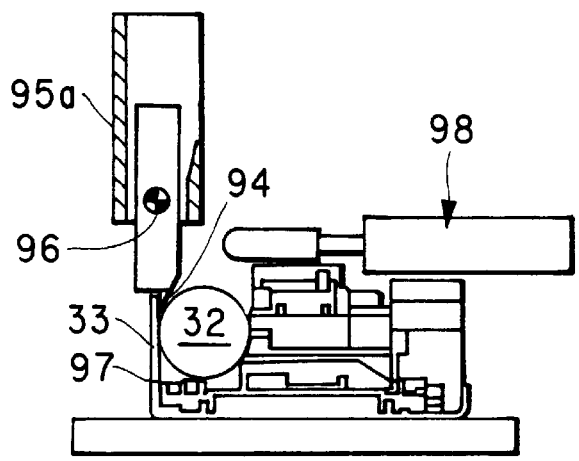
F I G. 13B
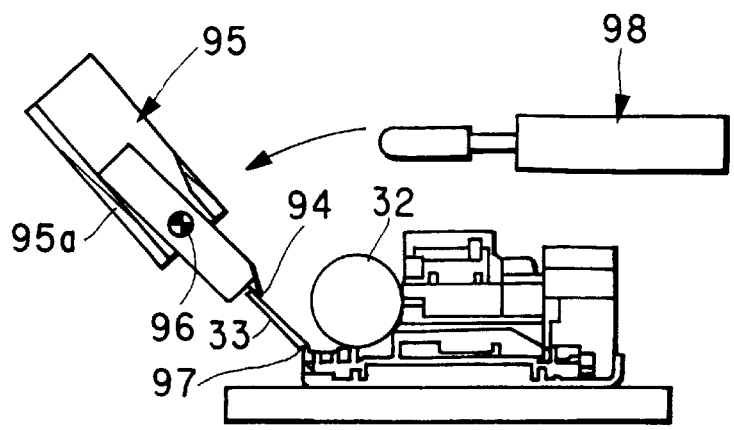
F I G. 13C

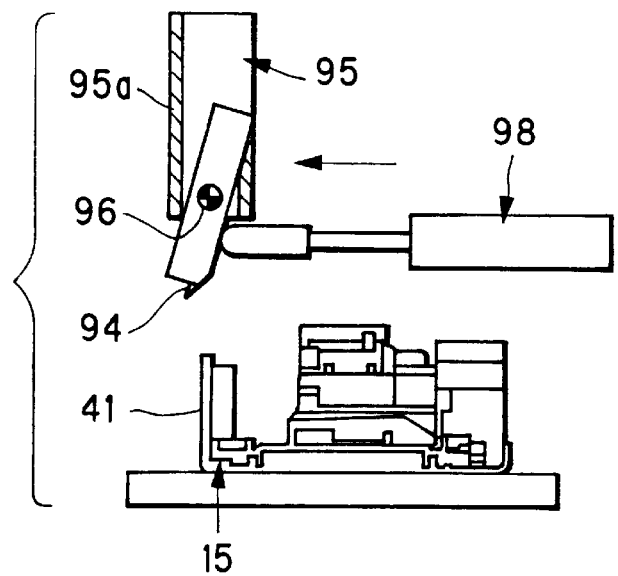
F I G. 14A
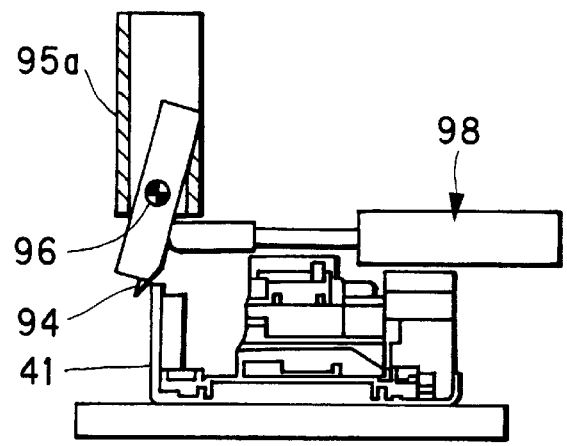
F I G. 14B
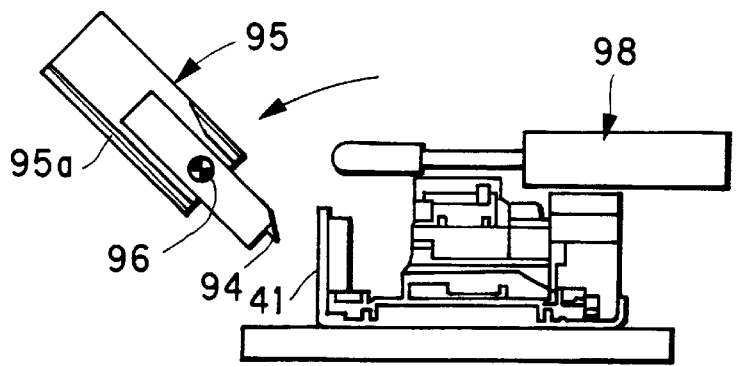
F I G. 14C

METHOD AND APPARATUS FOR DISASSEMBLING LENS-FITTED PHOTO FILM UNIT

BACKGROUND OF THE INVENTION

1. Field of the Invention

The present invention relates to a method and an apparatus for disassembling a lens-fitted photo film unit. More particularly, the present invention relates to a method and an apparatus for disassembling a lens-fitted photo film unit with increased efficiency.

2. Description Related to the Prior Art

U.S. Pat. No. 5,436,685 (corresponding to JP-A 3-200050) discloses a lens-fitted photo film unit, which is pre-loaded with photo film of a photo film cassette by operation in a factory. The lens-fitted photo film unit is constituted by a photo film containing unit, a front cover and a rear cover. The photo film containing unit accommodates the photo film. The front cover covers the front of the photo film containing unit. The rear cover covers the rear of the photo film containing unit. There are an exposure unit and a flash unit mounted on the photo film containing unit. The exposure unit incorporates a shutter mechanism and a taking lens. When all frames on the photo film are exposed, the lens-fitted photo film unit is forwarded to a photo laboratory, where the photo film cassette containing the photo film after exposures is removed from the lens-fitted photo film unit. The photo film is subjected to development and printing by use of the photo-finishing system available for any ordinary types of photo films. Photographic prints are produced and supplied to a user, to whom the photo film being developed is also returned.

There are various suggestions of recycling industrial products to protect the environment and reduce industrial wastes. There are two manners of recycling, including "regenerating" of material and "reusing" of parts. The regenerating is to withdraw molded parts or simply metal parts, to melt them, to obtain raw material from the melted parts, and to form molded parts or simply metal parts having a shape equal to their initial shape. The reusing is to withdraw unified parts in a combination of small elements, to select acceptable ones of them by checking their performance, and to transfer them to an assembly line together with the same unused parts. U.S. Pat. No. 5,615,395 (corresponding to JP-A 6-161042) discloses a recycling manner of the lens-fitted photo film unit. The photo film containing unit, the front cover and the rear cover are melted to obtain pellets of resin, and regenerated. The exposure unit is separated from the photo film containing unit, and reused. The flash unit is also reused. The flash unit is constituted by a printed circuit board, with which elements are connected, including circuit elements, the photo film, a synchro switch and the like. After the flash unit is removed from the photo film containing unit, a new dry battery is inserted in the flash unit for the reuse of the flash unit.

The lens-fitted photo film unit of the type incorporating the flash unit accommodates the battery as a power source. In an earlier model of this type, there is a bottom opening formed in the bottom of the lens-fitted photo film unit for insertion of the battery. A cardboard box or outer casing is used to package the lens-fitted photo film unit and also to close the bottom opening under the battery. In disassembly of this type of lens-fitted photo film unit, the battery can be easily separated after removal of the cardboard box and the front cover. There is a newer model of the flash built-in type, which has a cardboard belt or label of a small thickness instead of the cardboard box in consideration of reduction of the size of the lens-fitted photo film unit. But a problem arises in that the cardboard belt of a small width cannot close the bottom opening sufficiently under the battery. JP-A 8-328205 discloses a construction in which the rear cover has a bottom wall portion, which is protruded toward the front, for closing the bottom opening in the center of the photo film containing unit.

There has been a suggestion for reducing a cost required for recycling, for example by reducing the number of steps of the disassembly operation. However the exposure unit is separated from the photo film containing unit where the rear cover remains for the purpose of the exposure unit. The process of separation of the exposure unit must be safe enough to avoid damaging the exposure unit. High precision in the disassembly operation is required, to complicate the disassembly apparatus.

The lower side of the battery is covered and supported by a portion of the rear cover. Thus it is extremely difficult for an automatic apparatus to remove the battery in the state after removal of the front cover. Also the battery has a cylindrical shape, which is difficult for the automatic apparatus safely to grasp. Furthermore it is likely that a bottom lid located under the photo film cassette, or broken plastic pieces created by shock during disassembly or transport are dropped or scattered to disorder or break the automatic apparatus. Efficiency in the disassembly operation is lowered.

SUMMARY OF THE INVENTION

In view of the foregoing problems, an object of the present invention is to provide a method and an apparatus for disassembling a lens-fitted photo film unit, in which the number of steps in the disassembly operation is reduced, the efficiency in the disassembly is increased, and accidents in the disassembly are reduced.

In order to achieve the above and other objects and advantages of this invention, a lens-fitted photo film unit includes a main body, having a cassette holder chamber, a roll holder chamber and an exposure aperture, the cassette holder chamber containing a cassette, the roll holder chamber containing a roll of photo film drawn from the cassette, the exposure aperture being formed between the cassette holder chamber and the roll holder chamber for taking an exposure on the photo film. A front cover covers at least a front of the main body. A rear cover covers at least a rear of the main body. A first retainer mechanism has a retainer claw and a receiver portion engaged with each other, for connecting rear walls of the main body and the rear cover. An opening is formed in the rear cover, for uncovering at least a portion of the retainer claw or the receiver portion. For disassembly, there is a cover separating station. A release member is disposed to protrude upwards in the cover separating station, and inserted into the opening by setting the lens-fitted photo film unit in the cover separating station with the rear cover directed downwards. A release shifter shifts the release member relative to the opening, to disengage the retainer claw from the receiver portion by flexing the retainer claw away therefrom. A part shifter moves one of the rear cover and the main body away from a remainder thereof after disengaging the retainer claw from the receiver portion.

In a preferred embodiment, the lens-fitted photo film unit has first and second walls, of which one is disposed on the rear cover, and a remainder is disposed on the main body, the first wall being uncovered externally, the second wall being positioned inside the first wall. A second retainer mechanism has a retainer claw and a receiver portion engaged with each other, for connecting the first and second walls with each other. Furthermore for the disassembly, a release mechanism is inserted between the first and second walls, for disengaging the second retainer mechanism by spreading the first wall outwards, to disconnect the first and second walls from each other.

By this construction, the number of steps in the disassembly operation is reduced, because the rear cover is removed while directed downwards. The efficiency in the disassembly is increased.

In another preferred embodiment, the lens-fitted photo film unit has a flash unit, secured between the main body and the front cover in a removable manner, for emitting flash light. A battery supplies the flash unit with power. Furthermore for the disassembly, a front cover separator separates the front cover from the main body and the flash unit. A battery separator separates the battery from the flash unit after separating the front cover, subsequently the rear cover is separated from the main body.

The lens-fitted photo film unit is a flash built-in type or a flashless type. The flash built-in type includes a first bottom wall, formed with the rear cover, positioned outside a bottom of the main body and the battery, and partially flexible. The flashless type includes a second bottom wall, formed with the rear cover, positioned outside a bottom of the main body, and substantially entirely rigid. Furthermore for the disassembly, a spreader spreads the first bottom wall outwards after separating the front cover, to form a space, the battery separator being inserted into the space, and ejecting the battery from the flash unit by capturing the battery. A shifter mechanism is actuated if the lens-fitted photo film unit is the flashless type, for shifting the spreader to inhibit the spreader from contacting the second bottom wall.

By this construction, the efficiency in the disassembly is increased, because the spreader forms the space at the first bottom wall before the battery separator ejects the battery.

In still another preferred embodiment, the lens-fitted photo film unit has a first part held by connection of the front cover and the main body. Furthermore for the disassembly, a front cover separator separates the front cover and the main body from each other. A sucker sucks the first part set free upon separating the front cover and the main body, to prevent the first part from scattering.

By this construction, accidents in the disassembly are reduced, because the first part can be collected and does not intermingle with any part of the disassembling apparatus.

BRIEF DESCRIPTION OF THE DRAWINGS

The above objects and advantages of the present invention will become more apparent from the following detailed description when read in connection with the accompanying drawings, in which:

FIG. 13A is an explanatory view in elevation, illustrating a spreader for spreading a bottom wall under a battery;

FIG. 13B is an explanatory view in elevation, illustrating the spreader in an advanced state;

FIG. 13C is an explanatory view in elevation, illustrating the spreader in a pivoted state;

FIG. 14A is an explanatory view in elevation, illustrating the spreader shifted when the flashless type of housing is handled;

FIG. 14B is an explanatory view in elevation, illustrating the spreader in the advanced state;

FIG. 14C is an explanatory view in elevation, illustrating the spreader in the pivoted state;

DETAILED DESCRIPTION OF THE PREFERRED EMBODIMENTS OF THE PRESENT INVENTION

Figure 1:
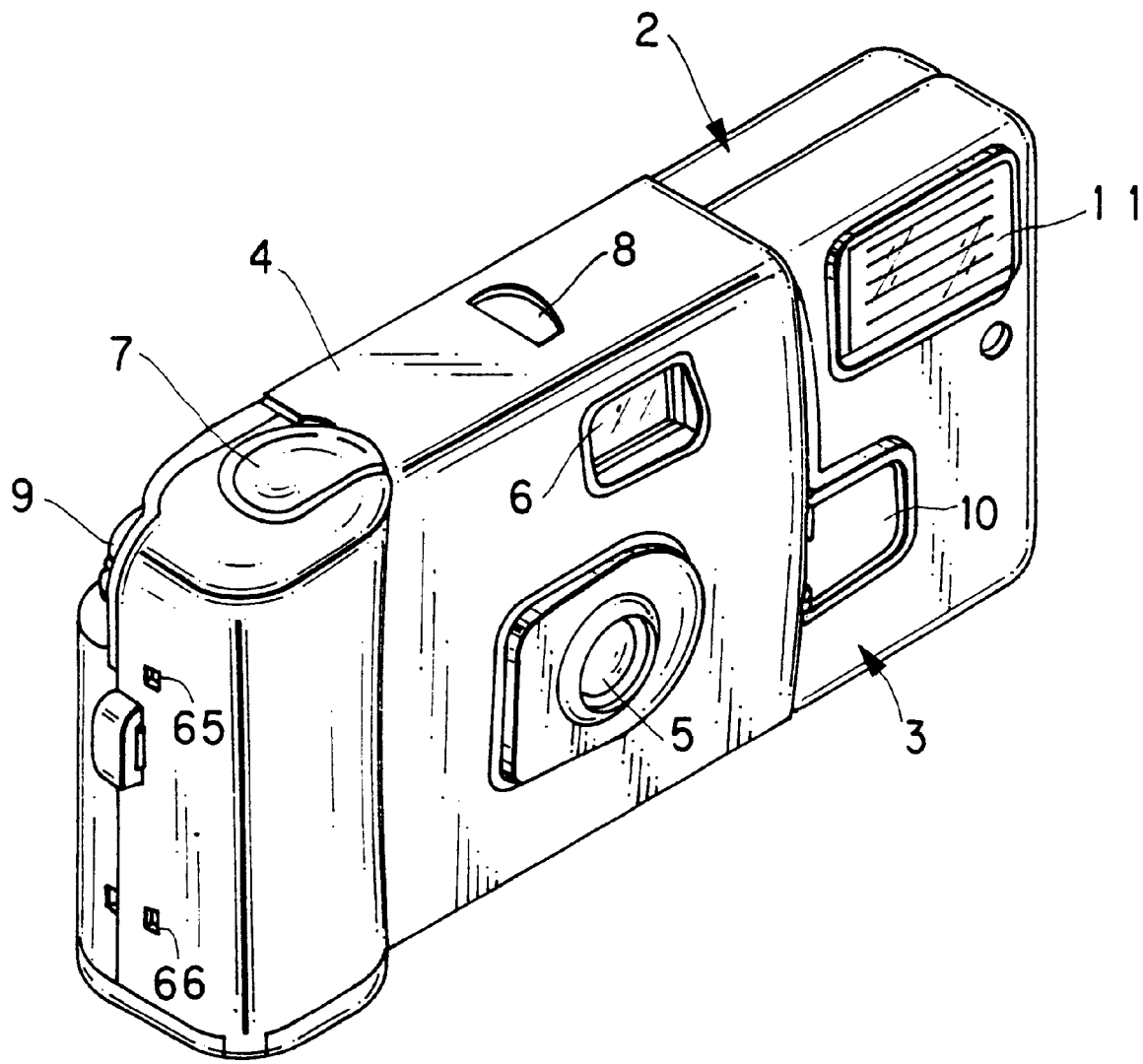
FIG. 1 is a perspective illustrating a lens-fitted photo film unit.

In FIG. 1, a lens-fitted photo film unit 2 of a flash built-in type is illustrated. The lens-fitted photo film unit 2 is constituted by a housing 3 having a structure for exposure, and a packaging belt 4 of a cardboard wound on the housing 3. Photographs can be taken by the housing 3 without removing the cardboard belt 4 from the housing 3. The cardboard belt 4 serves to neaten the appearance of the lens-fitted photo film unit 2, and consists of a paper sheet or a plastic sheet with a pattern printed on the outside. The lens-fitted photo film unit 2 has a taking lens 5, a finder window 6, a shutter release button 7, a frame counter disk 8, a winder wheel 9, a charger switch 10 and a flash emitter 11, which appear beside the cardboard belt 4 or through openings formed therein.

Figure 2:
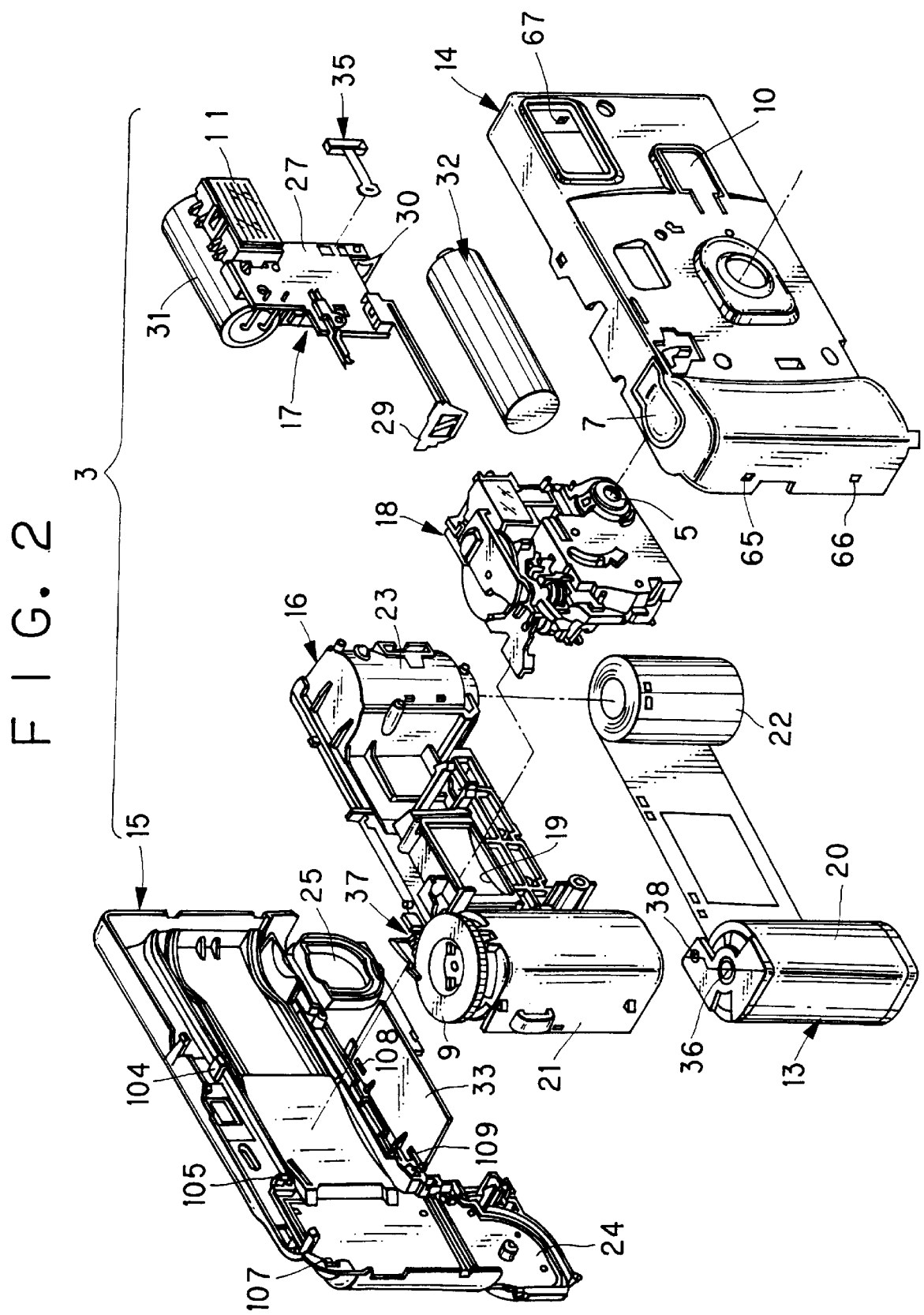
FIG. 2 is an exploded perspective illustrating a housing of the lens-fitted photo film unit.

In FIG. 2, the housing 3 is constituted by a photo film cassette 13, a front cover 14, a rear cover 15, a photo film containing unit 16, an electronic flash unit 17 and an exposure unit 18. The front cover 14 and the rear cover 15 are outer covers of the housing 3, and are parts molded from resin. The exposure unit 18 is a unified component including a frame counter mechanism, a shutter mechanism, a photo film one-frame advance mechanism and the taking lens 5, and is secured to a front of an exposure aperture 19 of the photo film containing unit 16 in a removable manner by engagement of claws or hooks.

The photo film containing unit 16 is a part molded from resin, and includes a cassette holder chamber 21 and a roll holder chamber 23 between which the exposure aperture 19 is located. The cassette holder chamber 21 accommodates a cassette 20. The roll holder chamber 23 accommodates a roll of unexposed photo film 22 which is drawn from the cassette 20. The rear of the photo film containing unit 16 is an open shape closed by the rear cover 15. The photo film 22 is light-tightly contained between the photo film containing unit 16 and the rear cover 15. Each time that one exposure is taken on the photo film 22, the photo film 22 is wound by one frame into the cassette holder chamber 21 from the roll holder chamber 23.

Bottoms of the cassette holder chamber 21 and the photo film holder chamber 23 have openings, which are closed by respective bottom lids 24 and 25 in an openable manner. The bottom lids 24 and 25 are formed integrally with the rear cover 15, and have a certain thickness. The bottom lid 25 for the roll holder chamber 23 closes the path for insertion of a tool or jig used for drawing the photo film 22 from the cassette 20 in the course of loading of the photo film 22. The bottom lid 24 for the cassette holder chamber 21 is opened for removal of the cassette 20 containing the photo film exposed by photographing operation.

The flash unit 17 is a unified component constituted by a printed circuit board 27, with which elements are connected, including circuit elements such as a flash charger circuit, the flash emitter 11, a synchro switch, contact segments 29 and 30, a main capacitor 31 and the like. A dry battery 32 is removably held between the contact segments 29 and 30. The printed circuit board 27 is disposed between the exposure unit 18 and the roll holder chamber 23 and held by engagement of claws or hooks.

The battery 32 has a cylindrical shape which is difficult for an automatic device to grasp. The battery 32 is disposed to lie under the exposure unit 18 to extend in parallel with an advance direction of photo film. A battery-covering bottom wall 33 is formed with the rear cover 15, is disposed between the bottom lids 24 and 25, and lies on the outside of the battery 32. The battery-covering bottom wall 33 is a lid of the hinge-connected type the same as the bottom lids 24 and 25.

Two contact points appear in the printed circuit board 27 for operating the flash charge circuit. The contact points are short-circuited by a metal segment 35, which is resilient and is pushed by operation of the charger switch 10. The metal segment 35 is held between the front of the roll holder chamber 23 and the rear of the front cover 14. The metal segment 35 has a channel-shaped contact end and a support end. The contact end is supported by the support end which is inserted in a recess formed in the front of the roll holder chamber 23.

The photo film cassette 13 has the cassette 20 consisting of two resinous molded parts. A spool 36 is contained in a rotatable manner in the cassette 20. Also a cassette shutter is used to close a photo film passageway in an openable manner. The photo film cassette 13 is IX 240 type in which the spool 36 is rotated after opening the cassette shutter so as to advance the photo film 22 to the outside of the cassette 20. The photo film 22 has a train of perforations, of which two are associated with each one of frames.

The winder wheel 9 is located on the top of the cassette holder chamber 21, and engaged with the spool 36 in a removable manner. A shutter closing mechanism 37 is located between the cassette holder chamber 21 and the exposure unit 18 for closing the cassette shutter of the cassette 20 in response to the opening movement of the bottom lid 24. The shutter closing mechanism 37 includes a shaft, disposed inside the cassette holder chamber 21, and engaged with a rod end 38 of the cassette shutter of the cassette 20. The shaft is rotated when the bottom lid 24 is operated to open, so that the shutter closing mechanism 37 closes the cassette shutter. Thus it is possible in a photo laboratory to remove the cassette 20 safely in a illuminated room.

The front cover 14 is secured to the photo film containing unit 16 by engagement of claws or hooks. The rear cover 15 is secured to the photo film containing unit 16 in the same manner. Thus any of the exposure unit 18, the flash unit 17, the front cover 14 and the rear cover 15 is removably mounted on the photo film containing unit 16.

Figure 3:
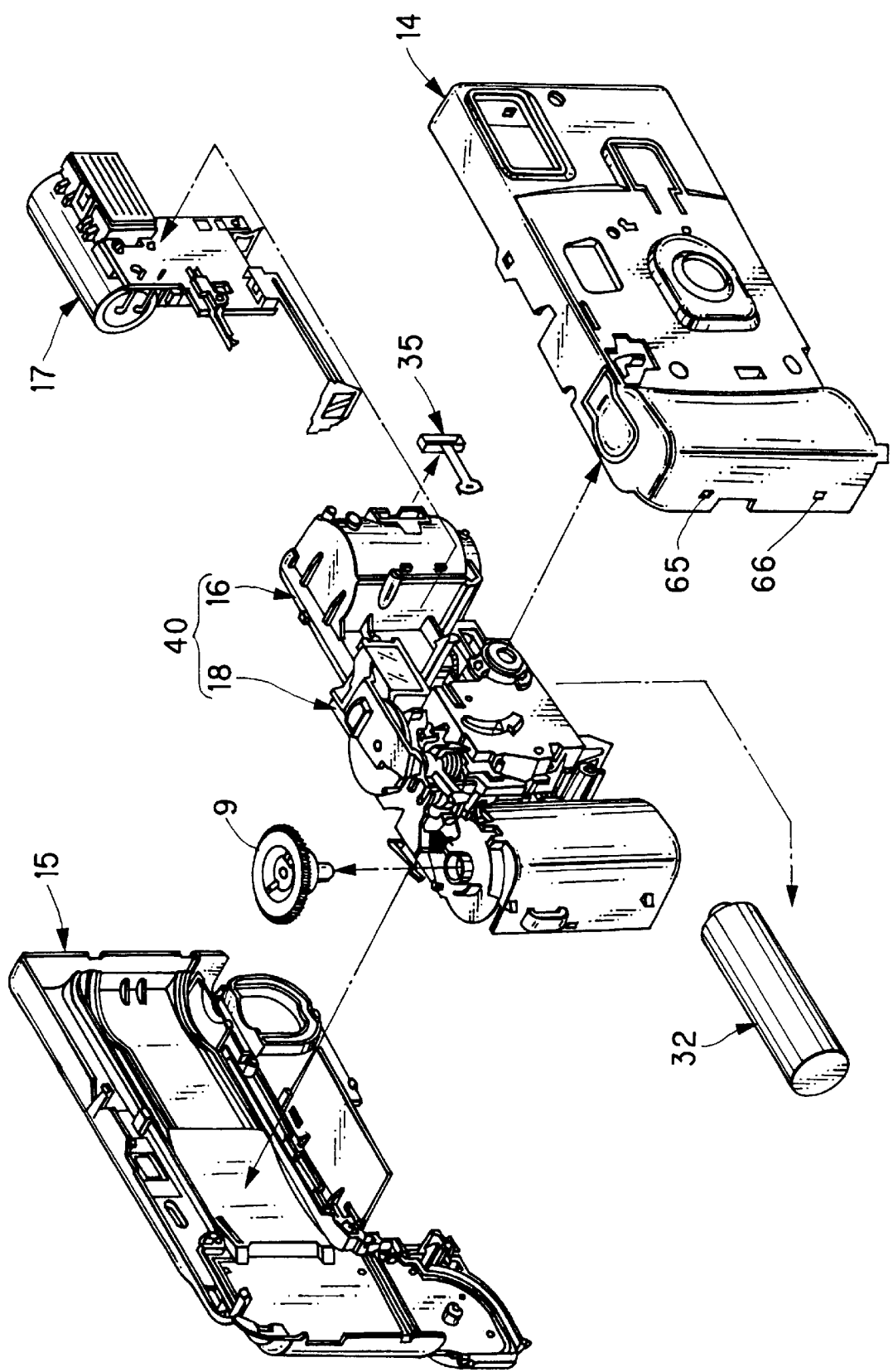
FIG. 3 is an explanatory view illustrating steps of disassembly of the housing.

The lens-fitted photo film unit 2, after being used, is withdrawn, forwarded to a factory, and recycled. In FIG. 3, the flash built-in type of the lens-fitted photo film unit 2 is disassembled to remove the front cover 14, the metal segment 35, the winder wheel 9, the battery 32, the flash unit 17 and the rear cover 15. Then only the exposure unit 18 and the photo film containing unit 16 remain assembled. This assembled combination of the exposure unit 18 and the photo film containing unit 16 is herein referred to as a main body 40. The front cover 14, the rear cover 15, the winder wheel 9 and the metal segment 35 are remolded, remelted or regenerated. The battery 32, the flash unit 17 and the main body 40 are reused.

Figure 4:
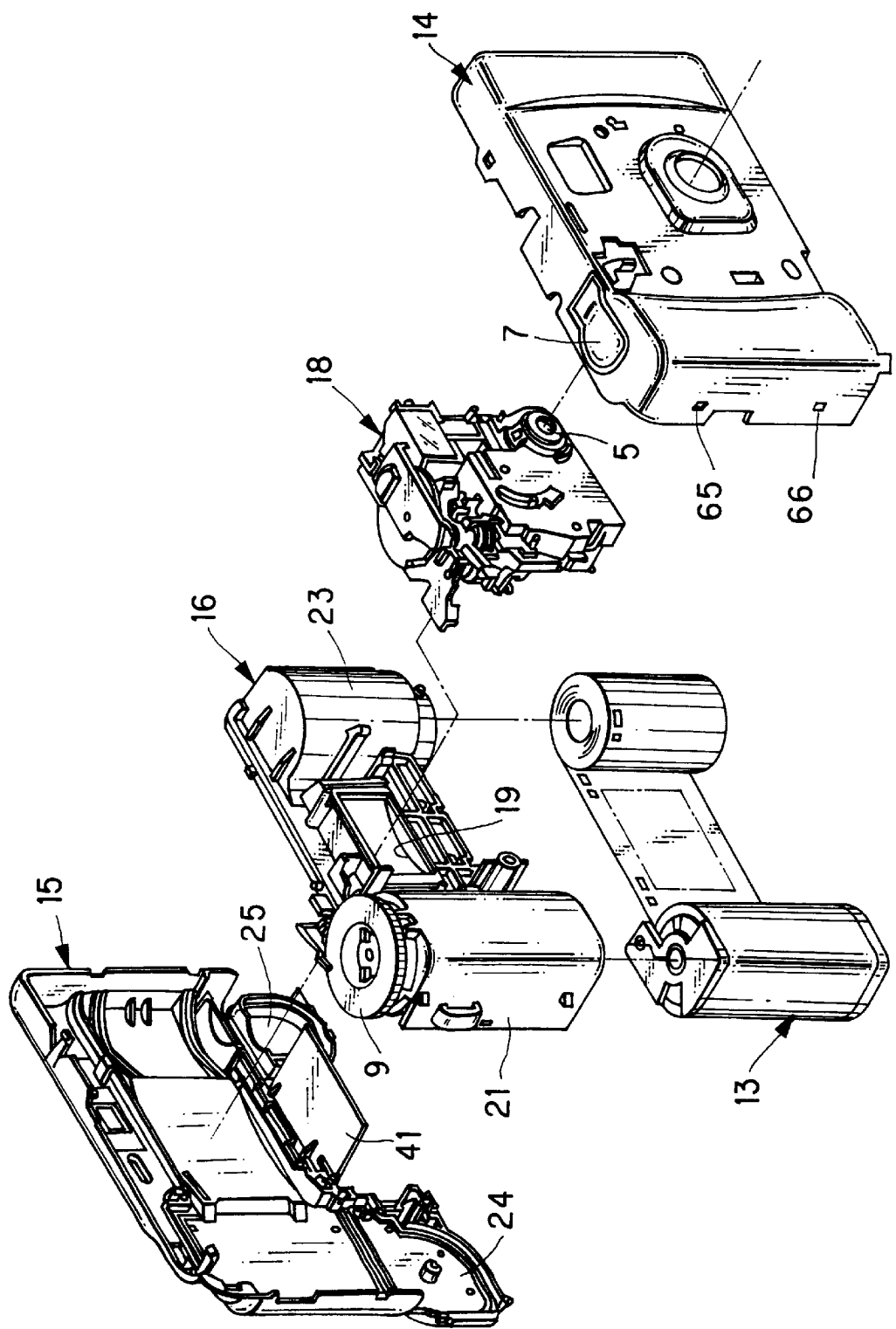
FIG. 4 is an exploded perspective illustrating a flashless type of housing.
Figure 5:
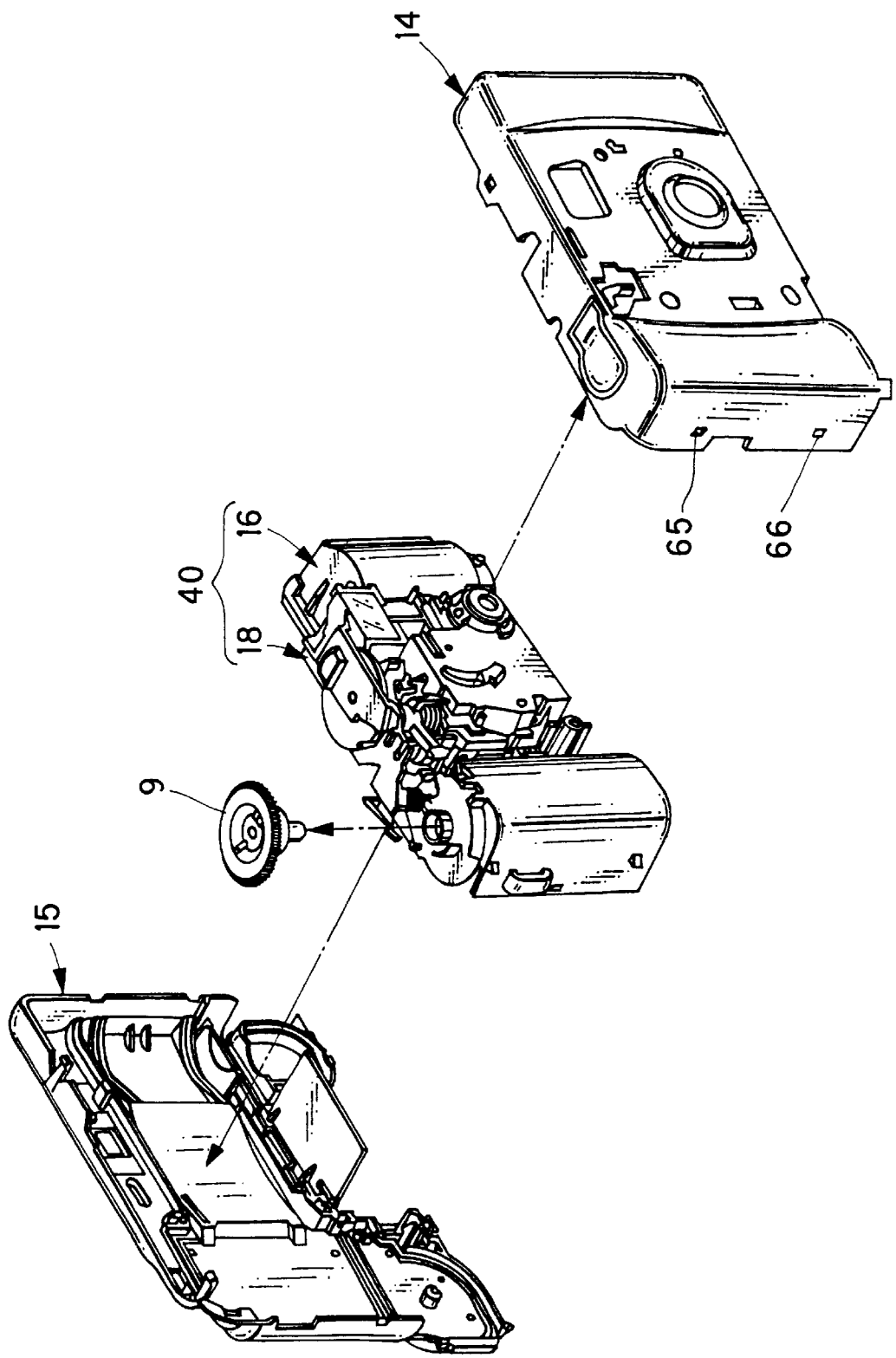
FIG. 5 is an exploded perspective illustrating steps of disassembly of the housing of the flashless type.

In FIG. 4, the lens-fitted photo film unit 2 of the flashless type has a smaller length in the photo film advance direction by an amount due to the lack of the battery 32 and the flash unit 17. Also the photo film containing unit 16, the front cover 14 and the rear cover 15 are shorter. A bottom wall 41 of the rear cover 15 is different from the battery-covering bottom wall 33, as it does not have a thinner hinge portion. The bottom wall 41 is not spread open. In FIG. 5, the front cover 14, the winder wheel 9 and the rear cover 15 are removed from the lens-fitted photo film unit 2, which of this flashless type has the main body 40 being reusable.

Figure 6:
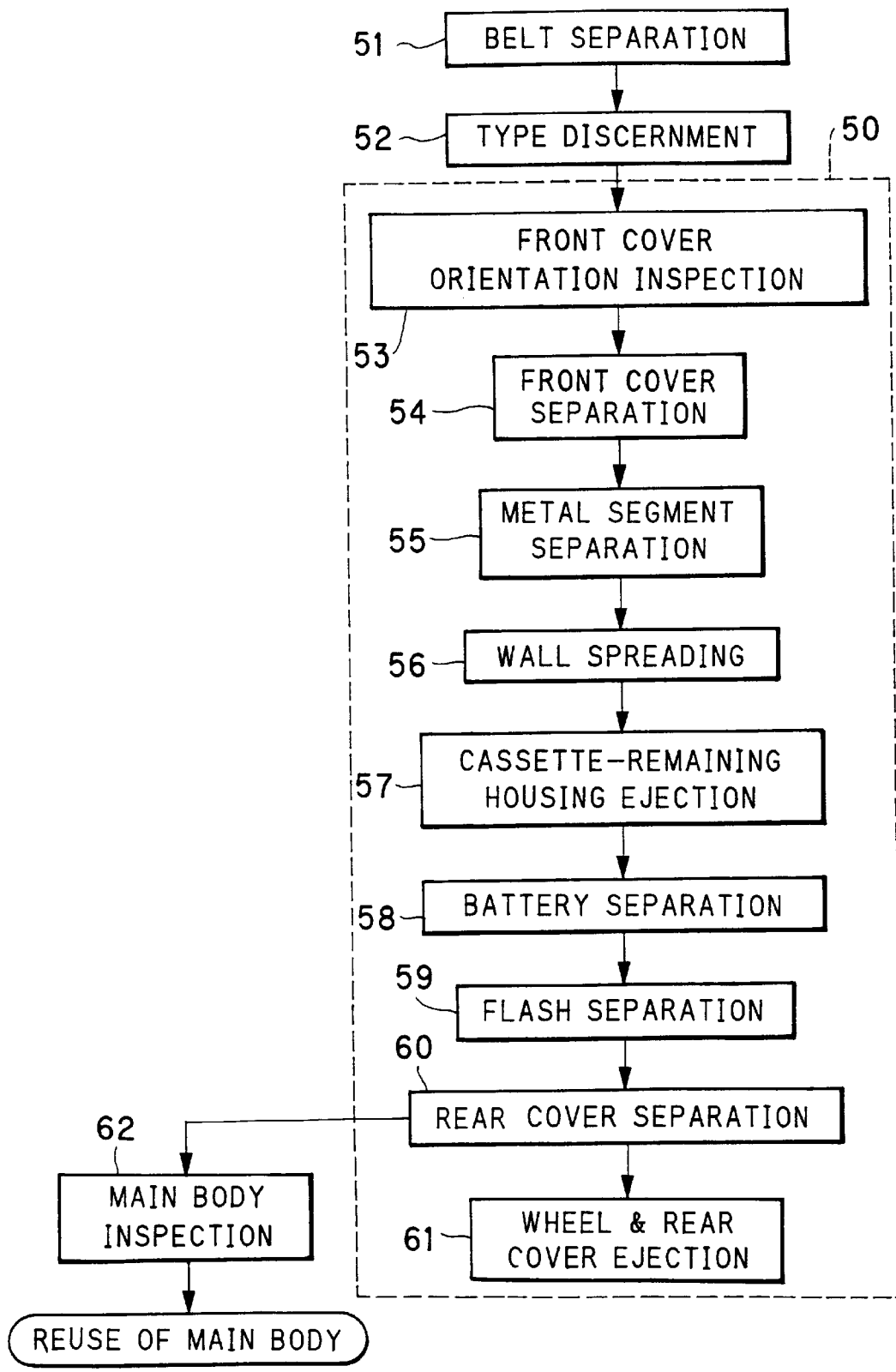
FIG. 6 is a flow chart illustrating the steps of the disassembly.

A disassembly line 50 for disassembly of the lens-fitted photo film unit 2 is now described. In FIG. 6, the lens-fitted photo film unit 2 used and withdrawn in the factory is conveyed along the disassembly line 50. The starting station of the disassembly line 50 is supplied with various lens-fitted photo film units of both the flash built-in type and the flashless type.

There is a process of belt separation 51 before the conveyance to the disassembly line 50 for the purpose of removal of the cardboard belt 4. Processes of type discernment 52 and front cover orientation inspection 53 are predetermined at the start of the disassembly line 50. The type discernment 52 is to discern the flash built-in type and the flashless type by measuring the outer size of the housing 3, and transfers data as a result of the discernment to the disassembly line 50. The front cover orientation inspection 53 measures a height of the housing 3 by use of a photoelectric sensor, and discerns whether the front cover 14 is loosed higher than is enough or remains fixed on the housing 3 according to data of the height. Only housings 3 in which the front cover 14 remains fixed are allowed to enter the disassembly line 50. It is thus possible to avoid much difficulties in the disassembly line 50.

The disassembly line 50 consists of an indexing rotary table or turntable and plural pallets. The pallets are arranged regularly on the indexing table in a circular manner. The indexing table is rotated with the housing 3 placed on each of the pallets, so as to convey the housing 3 to plural stations serially. On each of the pallets, the housing 3 is fixedly oriented by directing the front cover 14 upwards. Each station is provided with a positioning mechanism, which precisely positions the housing 3 on each of the pallets.

Stations in the disassembly line 50 are disposed for processes of front cover separation 54, metal segment separation 55, wall spreading 56, cassette-remaining housing ejection 57, battery separation 58, flash separation 59, rear cover separation 60 and wheel and rear cover ejection 61. The main body 40 separated by the rear cover separation 60 is conveyed in the disassembly line 50 to the station of main body inspection 62, by which the main body 40 is inspected to be reused.

Figure 7:
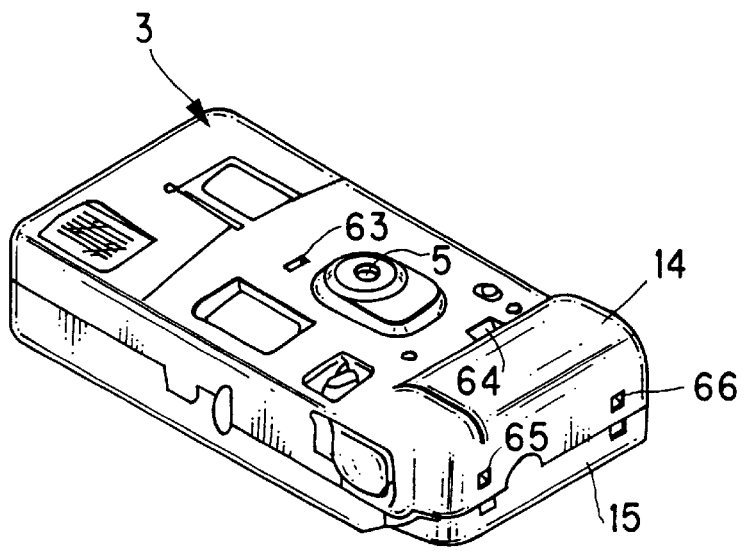
FIG. 7 is a perspective illustrating a top of the lens-fitted photo film unit.
Figure 8:
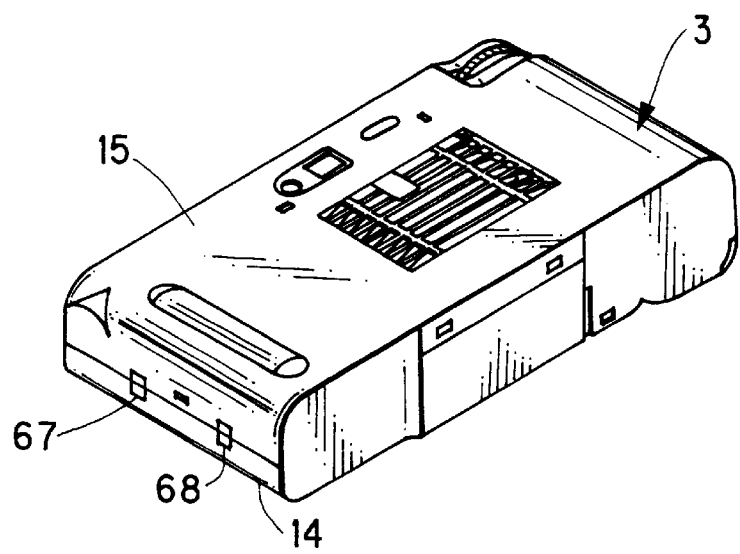
FIG. 8 is a perspective illustrating a rear of the lens-fitted photo film unit.

A station of the front cover separation 54 has a front cover separator for separating the front cover 14 from the housing 3. The claw or hooks are engaged in positions beside the taking lens and on lateral faces to secure the front cover 14 to the photo film containing unit 16. In FIG. 7, there are openings 63 and 64 formed in the front cover 14 and beside the taking lens 5. Retaining claws are disposed on the inside wall of the positions of the openings 63 and 64, and protrude to the inside. Receiving portions are formed with the front of the photo film containing unit 16 for the purpose of engagement with those retaining claws. In FIG. 8, receiver holes 65, 66, 67 and 68 as two pairs are formed in the front cover 14 in positions near to a joining line between the front cover 14 and the rear cover 15. In correspondence to the receiver holes 65–68, there are retaining claws formed with the photo film containing unit 16 for engagement with those.

Figure 9:
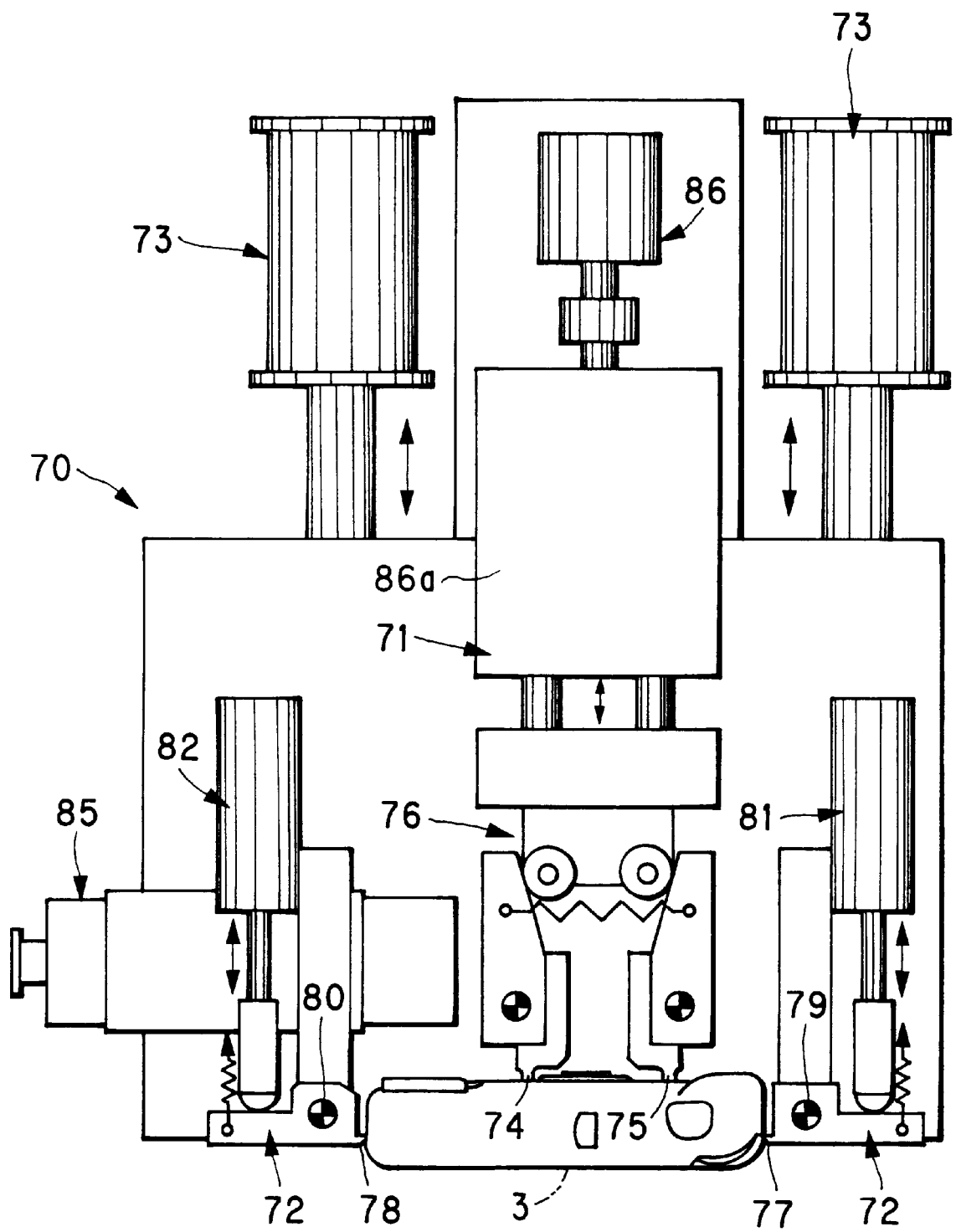
FIG. 9 is an explanatory view in elevation, illustrating a front cover separator.

In FIG. 9, a front cover separator 70 is constituted by a first separator mechanism 71 and second separator mechanisms 72 disposed laterally. The first separator mechanism 71 disengages the claws or hooks of the front cover 14 and the photo film containing unit 16. The first separator mechanism 71 is moved up and down by a lifter 86. Also the separator mechanisms 71 and 72 are moved up and down by a lifter 73. The first separator mechanism 71 is constituted by a drive device 86a, release claws 74 and 75, and a chuck 76. The release claws 74 and 75 are arranged at an interval between the openings 63 and 64 in the front cover 14. The chuck 76 causes the release claws 74 and 75 to rotate in respective rotational directions toward the center, so as to hold the openings 63 and 64. The first separator mechanism 71, when the drive device 86a operates, actuates the chuck 76 for insertion of the release claws 74 and 75, disengagement, and holding of the front cover 14.

Figure 10:
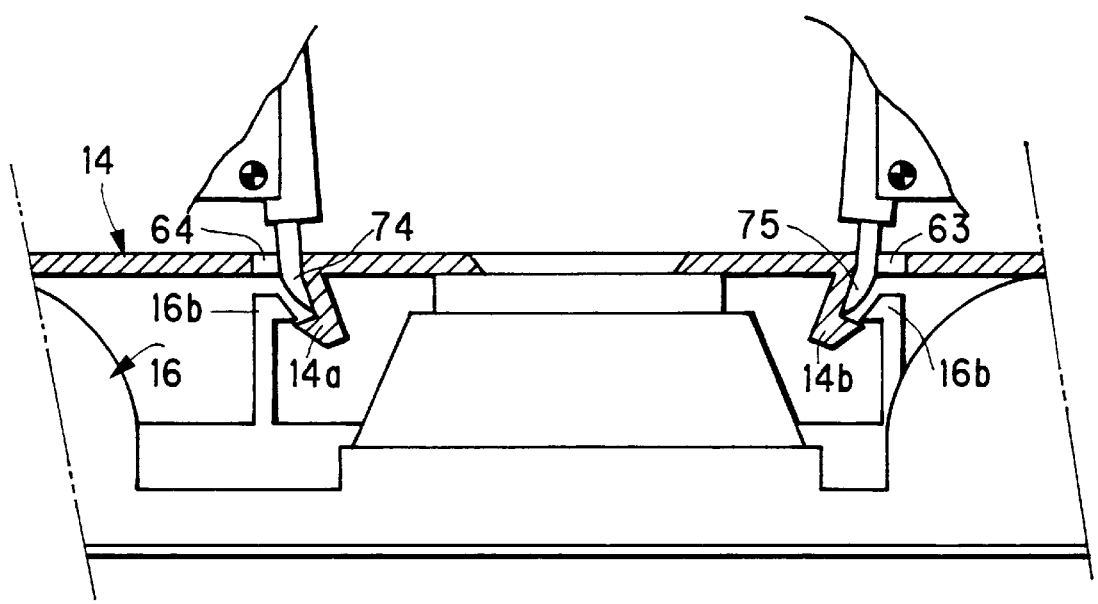
FIG. 10 is an explanatory view in section, illustrating the housing with release claws of the front cover separator.

In FIG. 10, the first separator mechanism 71 is caused by movement of the lifter 86 to insert the release claws 74 and 75 through the openings 63 and 64 toward retainer claws 14a and 14b and receiver claws 16a and 16b. Then the drive device 86a causes the chuck 76 to rotate the release claws 74 and 75 toward the center of the front cover 14 to flex the retainer claws 14a and 14b. Thus the retainer claws 14a and 14b are disengaged from the receiver claws 16a and 16b of the photo film containing unit 16. Also the release claws 74 and 75 remain in a state of pushing the retainer claws 14a and 14b to hold the front cover 14.

The second separator mechanism 72 has release claws 77 and 78, which are arranged at an interval between the receiver holes 65 and 67 and between the receiver holes 66 and 68, and are opposed to respective lateral faces of the housing 3. The release claws 77 and 78 are pivoted by respective rotating mechanisms 81 and 82 about pivots 79 and 80.

The second separator mechanism 72 is provided with a slider mechanism 85, which determines an interval between the release claws 77 and 78 in accordance with the flash built-in or flashless type of the housing 3. In the present embodiment, the slider mechanism 85 automatically slides the release claw 78 on the side of the roll holder chamber 23 for the type of the housing 3, with the release claw 77 kept stationary on the side of the cassette holder chamber 21.

Figure 11:
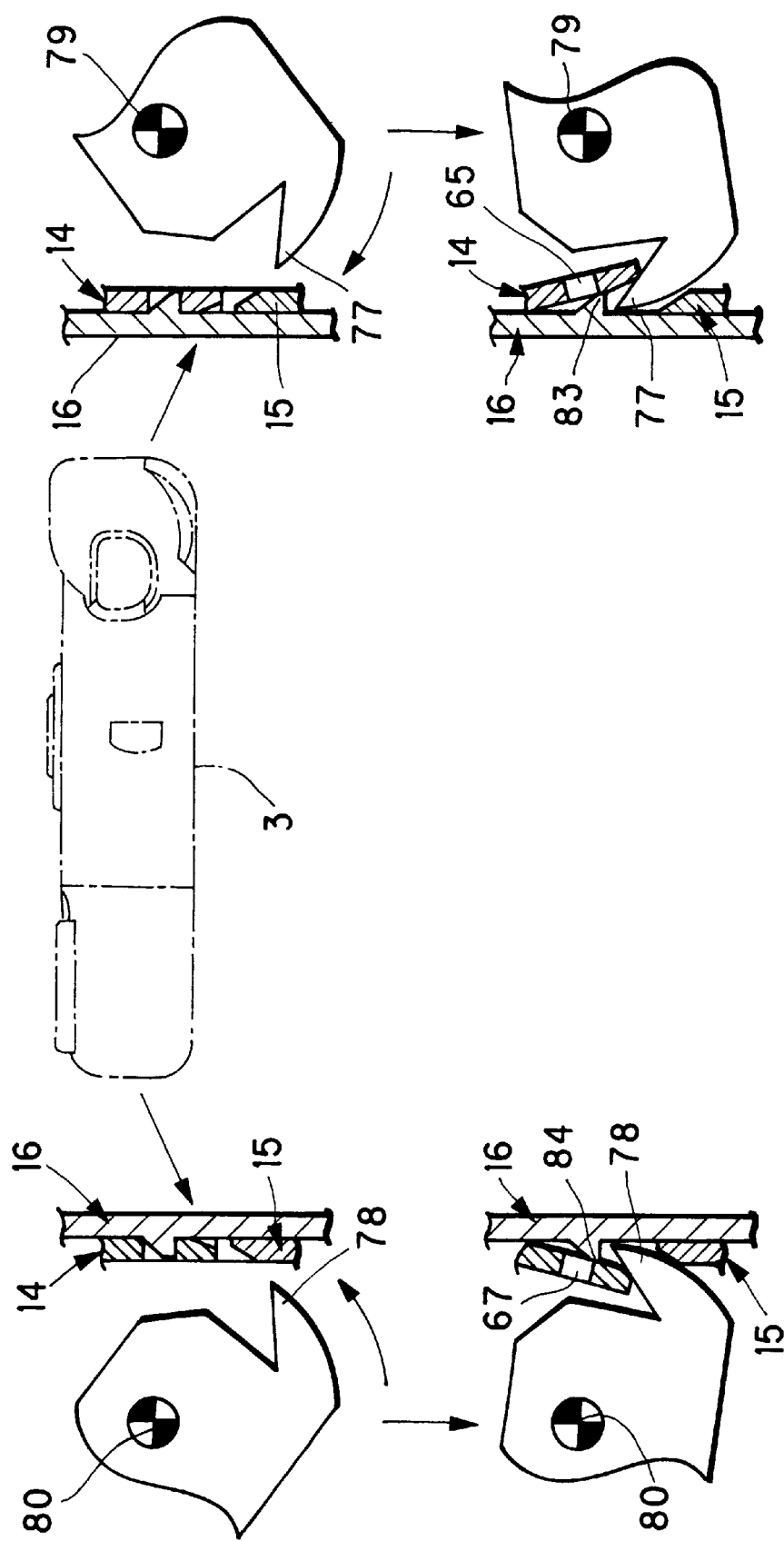
FIG. 11 is an explanatory view illustrating the housing with release claws at lateral faces of the housing.

In FIG. 11, the release claws 77 and 78 move to the lateral faces of the housing 3 upon vertical movement of the lifter 73. Then the rotating mechanisms 81 and 82 operate to pivot the release claws 77 and 78 about the pivots 79 and 80. Ends of the release claws 77 and 78 enter the inside of the joint edges of the front cover 14, and bend the joint edges toward the outside, so that the receiver holes 65 and 66 are disengaged from retainer claws 83 and 84. Note that the release claws 77 and 78 may move straight back and forth instead of the rotational movement. In the present embodiment only the mechanism to insert the release claws 77 and 78 can readily disengage the claws or hooks. No more complicated mechanism is required. Thus the cost for mechanical structure of the disassembling apparatus can be reduced.

The release claws 77 and 78 have a partially rounded shape on the side opposite to the engagement with edges of the front cover 14, and therefore disengage the claws without interfering with the photo film containing unit 16. After disengagement of the release claws 74, 75, 77 and 78 by means of the separator mechanisms 71 and 72, the lifter 86 starts moving up. The first separator mechanism 71 is responsively caused to raise the front cover 14 which is captured by the chuck 76. At this time the front cover 14 does not come again to be engaged with the photo film containing unit 16 even when the front cover 14 stops being captured. Then the photo film containing unit 16 and the front cover 14 are conveyed together to next station in an orientation of loosely placing the front cover 14 on the photo film containing unit 16. In next station the front cover 14 is removed from the photo film containing unit 16 and ejected. It is to be noted that the front cover 14 may be ejected in the station of the front cover separation 54. For this purpose of the ejection the lifter 86 can operate to move down. The front cover 14 ejected in any of those manners is melted and remolded.

Figure 12:
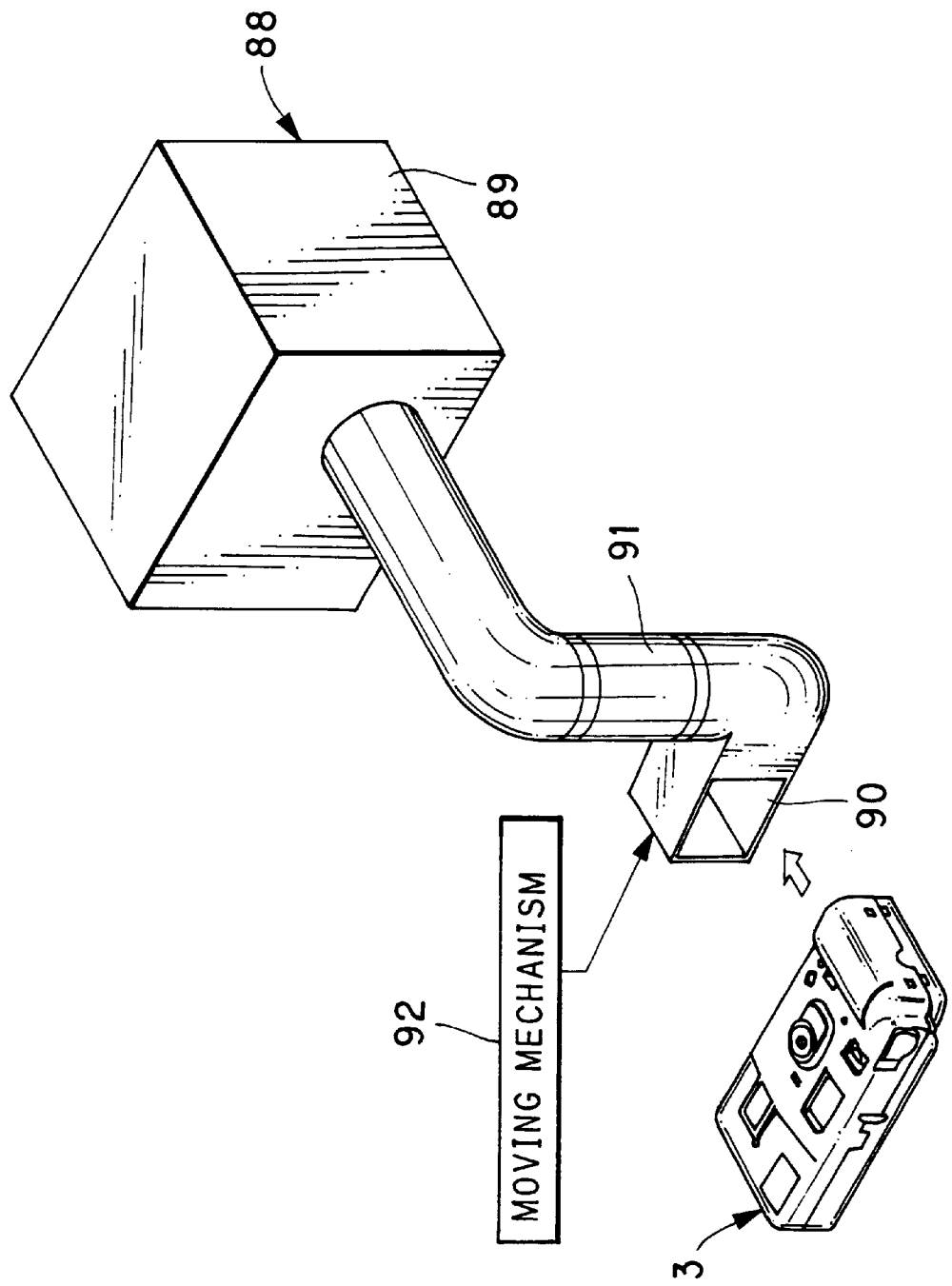
FIG. 12 is a perspective illustrating a sucker associated with the front cover separator.

For the front cover separation 54, a sucker unit 88 is used to eliminate broken plastic pieces which would cause problems in the disassembly line 50. In FIG. 12, the sucker unit 88 is constituted by a sucker 89, a nozzle 90, a hose 91 and the like. The hose 91 is flexible and extensible and connects the nozzle 90 with the sucker 89. Before the removal of the front cover 14, the nozzle 90 is set by a cylinder 92 or other moving units in the vicinity of the bottom lid 24 of the housing 3. The sucker unit 88 operates for suction through the nozzle 90 to collect the bottom lid 24 and other broken pieces, the bottom lid 24 being broken away from the rear cover 15 during or upon the removal of the front cover 14, and the broken pieces being created from the inside of the housing 3.

In a station of the metal segment separation 55, the housing 3 without the front cover 14 is conveyed and then the metal segment 35 is removed. The metal segment 35 being withdrawn is reused.

For the wall spreading 56, a lid opener unit is disposed, which opens the bottom lid 24 under the cassette holder chamber 21, the bottom lid 25 under the roll holder chamber 23 and the battery-covering bottom wall 33 at the same time. The bottom lid 24 is opened for the purpose of checking absence of the cassette 20 in the cassette holder chamber 21. The bottom lid 25 is opened for the purpose of preventing the bottom lid 25 from obstructing a subsequent process of separating the main body 40. As the lid opener unit for the bottom lids 24 and 25 and the battery-covering bottom wall 33 is single in the same station and actuates for one time, the cost for the mechanical structure can be reduced. Efficiency in the disassembly is raised.

The lid opener unit is constituted by at least three spreader claws and an up-and-down rotating mechanism. The spreader claws push open the battery-covering bottom wall 33 and the bottom lids 24 and 25 in contact with a side opposite to the opening direction. The up-and-down rotating mechanism rotates up and down the spreader claws. The spreader claws operate in the same manner to open the portions. Only a mechanism associated with a spreader claw 94 for the battery-covering bottom wall 33 is hereinafter described with reference to FIGS. 13A–13C in order to describe all the spreader claws.

In FIG. 13A, the spreader claw 94 is pivotal about a pivot 96 disposed on a support plate 95. An initial position of the spreader claw 94 is defined to lie above the battery-covering bottom wall 33. In FIG. 13B, the support plate 95 is moved down by actuation of up-and-down rotating mechanism (not shown) to insert the spreader claw 94 in a gap inside the battery-covering bottom wall 33. In FIG. 13C, the support plate 95 is rotated counterclockwise by the up-and-down rotating mechanism to rotate the spreader claw 94 in the opening direction of the battery-covering bottom wall 33, which is thus opened. The support plate 95 is provided with a blocking plate 95a, which prevents the spreader claw 94 from rotating inwards away from the battery-covering bottom wall 33. The battery-covering bottom wall 33 is pushed open by bending a hinge portion 97, at which the battery-covering bottom wall 33 remains connected with the rear cover 15.

The flashless type of the lens-fitted photo film unit does not accommodate a battery. The bottom wall 41 does not have the hinge portion 97 of the battery-covering bottom wall 33, and is not openable. However the up-and-down rotating mechanism drives all the spreader claws for the bottom lids 24 and 25 and the battery-covering bottom wall 33. The spreader claw 94 cannot be stopped without stopping all the remaining spreader claws. Accordingly there is an anti-interference shifter mechanism of FIGS. 14A–14C for shifting the spreader claw 94 away from the inside of the bottom wall 41 rotationally about the pivot 96 upon small downward pivotal movement of the spreader claw 94. The anti-interference shifter mechanism is constituted by a shifting cylinder 98 and a lifter (not shown). The shifting cylinder 98 rotates away the spreader claw 94 to the right about the pivot 96. The lifter moves up and down together with the support plate 95.

When the lens-fitted photo film unit 2 of the flashless type is conveyed, a rod of the shifting cylinder 98 in FIG. 14A causes the spreader claw 94 to rotate away from the lens-fitted photo film unit 2 before the spreader claw 94 is lowered. In FIG. 14B, the shifting cylinder 98 is kept in this actuated state, and is caused by the lifter to move vertically together with the spreader claw 94. In FIG. 14C, the spreader claw 94 is positioned outside the bottom wall 41. Even when the support plate 95 rotates counterclockwise, the spreader claw 94 does not open the bottom wall 41.

A station of the cassette-remaining housing ejection 57 inspects the cassette holder chamber 21 and confirms the lack of the cassette 20. A contact sensor is set in the bottom opening from which the bottom lid 24 has been removed to check the inside of the cassette holder chamber 21. If the cassette 20 exists, then the entirety of the housing 3 is eliminated from the disassembly line 50.

Figure 15A:
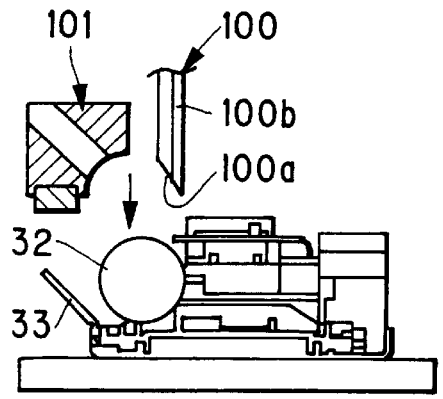
FIG. 15A is an explanatory view in elevation, illustrating a battery separator.
Figure 15B:
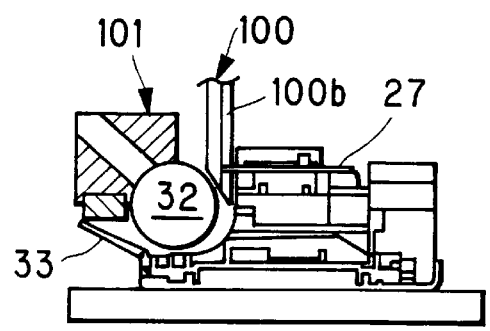
FIG. 15B is an explanatory view in elevation, illustrating the battery separator in an advanced state.
Figure 15C:
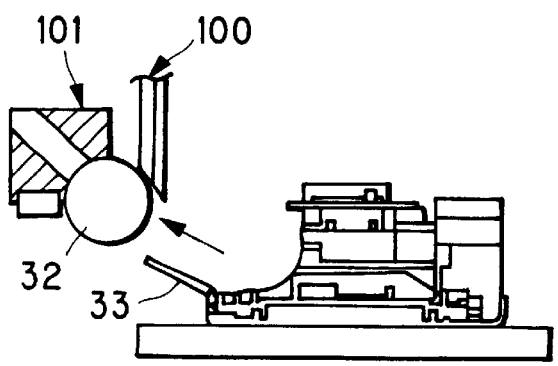
FIG. 15C is an explanatory view in elevation, illustrating the battery separator in an ejecting state.
Figure 16:
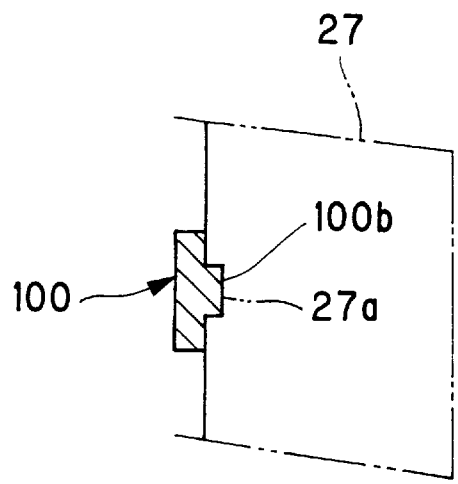
FIG. 16 is a horizontal section illustrating a battery push rod.

In FIGS. 15A–15C, a battery separator is depicted for the battery separation 58. The battery separator is constituted by a battery push rod 100, a permanent magnet or electromagnet 101, and a moving mechanism (not shown). The moving mechanism moves the battery push rod 100 and the electromagnet 101 to one of three positions, which are an initial position of FIG. 15A, a close position of FIG. 15B and an ejecting position of FIG. 15C. The initial position is away from the battery 32, and the close position being close to the battery 32. The battery push rod 100 has an inclined face 100a, which pushes the battery 32 toward the battery-covering bottom wall 33 when in the close position. The battery push rod 100 is provided with a ridge 100b, which is positioned opposite to the inclined face 100a, and extends in a direction defined from the initial position to the close position. In FIG. 16, the ridge 100b enters a cutout 27a of the printed circuit board 27 when the moving mechanism moves from the initial position to the close position. The push of the ridge 100b to the cutout 27a enables the inclined face 100a to press the battery 32 in a reliable manner.

The electromagnet 101 of FIGS. 15A–15C is moved together with the battery push rod 100 by the moving mechanism. The electromagnet 101 is controlled for attraction or deenergization by an electrical signal. The battery 32 is removed by the battery push rod 100 from the contact segments 29 and 30, and then attracted by the electromagnet 101 in the close position as illustrated in FIG. 15B. The moving mechanism moves the electromagnet 101 to the ejecting position of FIG. 15C where the battery 32 is ejected. Then the electromagnet 101 returns to the initial position of FIG. 15A. Note that a permanent magnet may be used instead of the electromagnet 101. But a removing mechanism must be added for the purpose of removing the battery 32 from the permanent magnet.

For the flash separation 59, there are disposed a discharge device and a flash separator. The discharge device discharges the main capacitor 31 of the flash unit 17. After this, the flash separator removes the flash unit 17 from the photo film containing unit 16. Those devices are structurally the same as disclosed in U.S. Pat. No. 5,615,395 (corresponding to JP-A 6-161042).

Figure 17:
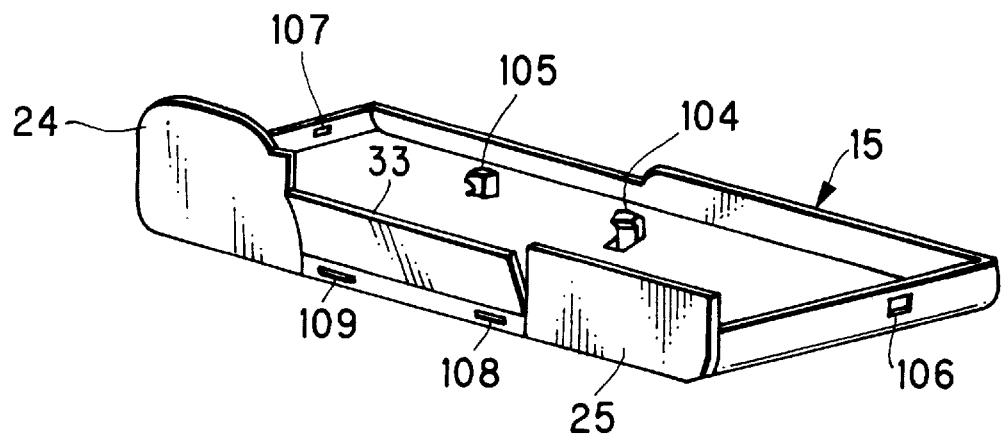
FIG. 17 is a perspective illustrating retainer claws and receiver portions of a rear cover.

For the rear cover separation 60, a rear cover separator is disposed and oriented in the same manner as the front cover separation 54. The front having the taking lens 5 is directed upwards while the rear cover 15 is separated from the main body 40. Six retainer mechanisms are used to secure the rear cover 15 to the main body 40. Those retaining mechanisms include retainer claws 104 and 105 and receiver holes 106, 107, 108 and 109, all of which are disposed on the rear cover 15. In FIG. 17, the retainer claws 104 and 105 are disposed on the inner face and near to the center, protrude forwards, and are engaged with receiver portions of the photo film containing unit 16 with resiliency. The receiver holes 108 and 109 are formed in the bottom where the battery-covering bottom wall 33 is located, oriented upwards, and engaged with retaining claws of the photo film containing unit 16. The receiver holes 106 and 107 are formed in lateral faces, oriented horizontally, and engaged with retaining claws of the photo film containing unit 16.

Figure 18A:
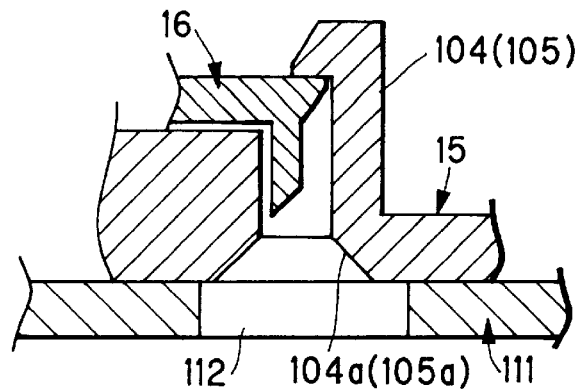
FIG. 18A is an explanatory view in section, illustrating a retainer mechanism between rear walls of the rear cover and the main body.

A station of the rear cover separation 60 has separator mechanisms including release claws positioned to opposing to the retainer claws 104 and 105, the receiver holes 108 and 109, and the receiver holes 106 and 107. The first of the separator mechanisms deforms the retainer claws 104 and 105 to disengage the rear face of the photo film containing unit 16 from the rear cover 15. Openings 104a and 105a are formed through the rear cover 15 in positions close to the retainer claws 104 and 105 by molding operation of the rear cover 15. In FIG. 18A, a pallet 111 has a base plate receiving the rear cover 15 of which the openings 104a and 105a are directed down to the pallet 111. Openings 112 are formed in the pallet 111, positioned at the openings 104a and 105a, for insertion of release claws through the base plate of the pallet. Note that the retainer claw 105 is constructed equally with the retainer claw 104. Only the retainer claw 104 is hereinafter described with reference to FIGS. 18A–18C to explain both the retainer claws 104 and 105.

Figure 18B:
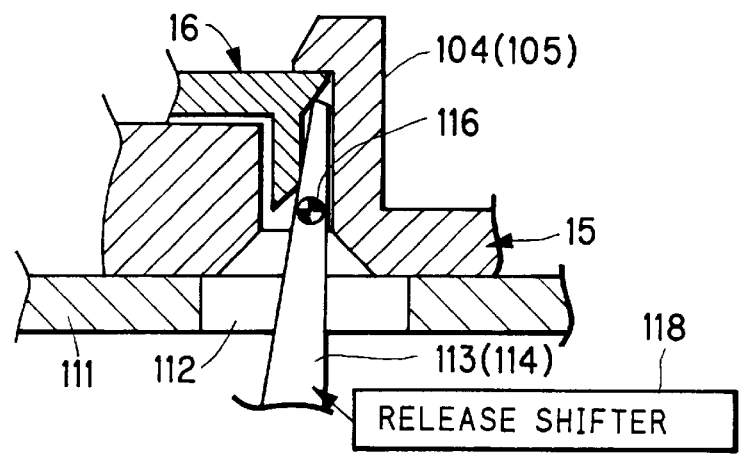
FIG. 18B is an explanatory view in section, illustrating the retainer mechanism and a release claw in an inserted state.

In FIG. 18B, the first separating mechanism is constituted by release claws 113 and 114 and a release shifter 118, which is disposed under the pallet 111 and moves each of the release claws 113 and 114. When the housing 3 is conveyed to the station of the rear cover separation 60, the moving mechanism is actuated to insert the release claws 113 and 114 to the position of FIG. 18B. Ends of the release claws 113 and 114 come through the openings 112 in the pallet 111 and the openings 104a and 105a in the rear cover 15, and are positioned in the vicinity of retention of the retainer claws 104 and 105.

Figure 18C:
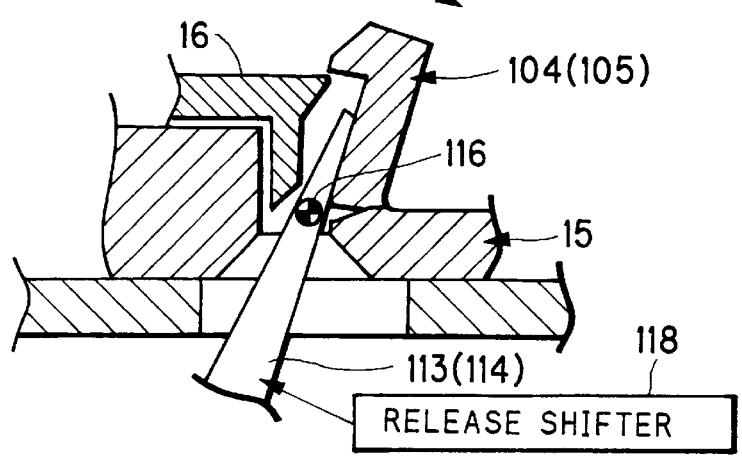
FIG. 18C is an explanatory view in section, illustrating the retainer mechanism and a release claw in a disengaging state.

A pivot 116 is defined about which each of the release claws 113 and 114 rotates. The pivot 116 is so positioned that the release claws 113 and 114 enter the inside of the openings 104a and 105a in the rear cover 15. The first separator mechanism includes a drive device (not shown) for rotating the release claws 113 and 114. After the insertion, the drive device starts actuation, to pivot the release claws 113 and 114 about the pivot 116. As depicted in FIG. 18C, a rotational direction of the release claws 113 and 114 is in reverse to an engaging direction of the retainer claws 104 and 105. Therefore the release claws 113 and 114 bend and break only the retainer claws 104 and 105 without contacting the photo film containing unit 16.

Figure 19:
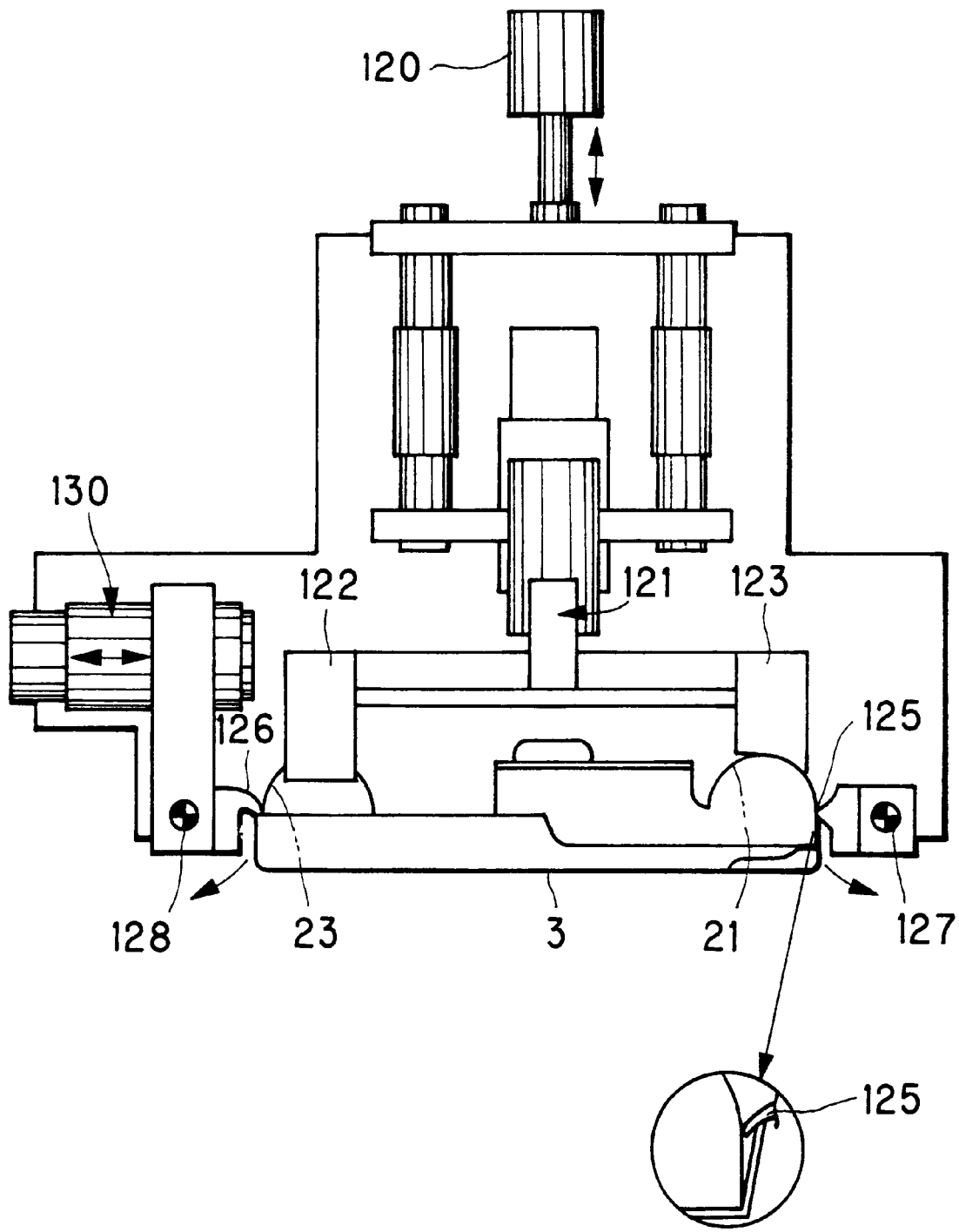
FIG. 19 is an explanatory view in elevation, illustrating a rear cover separator.

A second one of the separator mechanisms is constituted by two release claws, a separator rod 132 and a chuck 121. The release claws unfasten the lateral faces of the rear cover 15. The separator rod 132 unfastens the bottom face of the rear cover 15. See FIGS. 20A and 20B. The chuck 121 chucks the housing 3. A cylinder 120 included in a cover shifter is driven to move up and down those elements as illustrated in FIG. 19. Note that depiction of the separator rod 132 is omitted from FIG. 19 in order to simplify the drawing.

The second separator mechanism operates at the same time as the first separator mechanism. At first the chuck 121 is actuated. In FIG. 19, the chuck 121, which is included in the cover shifter, is constituted by holders 122 and 123 for pressing respectively the outside of the cassette holder chamber 21 and the roll holder chamber 23 of the housing 3 in order to hold the housing 3.

Release claws 125 and 126 included in the rear cover separator are positioned on lateral faces of the housing 3, and rotatable about respective pivots 127 and 128. The release claws 125 and 126 rotate to pick up and externally spread lateral edges of the rear cover 15, so that the receiver holes 106 and 107 are disengaged from retainer claws of the photo film containing unit 16. A slider 130 is associated with the release claw 126 on the side of the roll holder chamber 23, and slides to each position predetermined for a selected one of the types of the lens-fitted photo film unit.

Figure 20A:
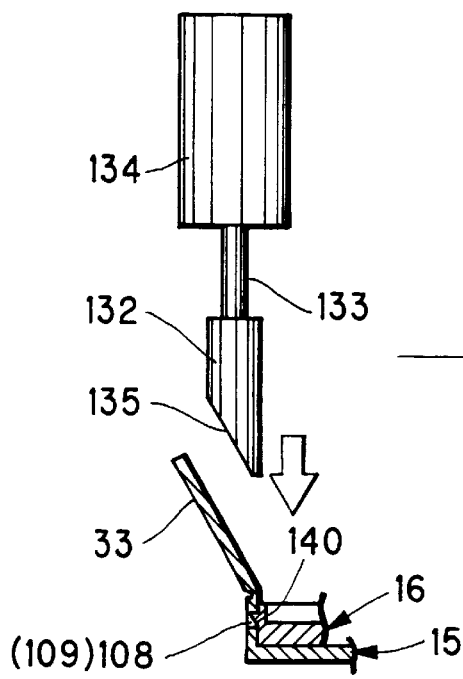
FIG. 20A is an explanatory view in section, illustrating a start of bottom wall separation of the rear cover separator for a flash built-in type.
Figure 20B:
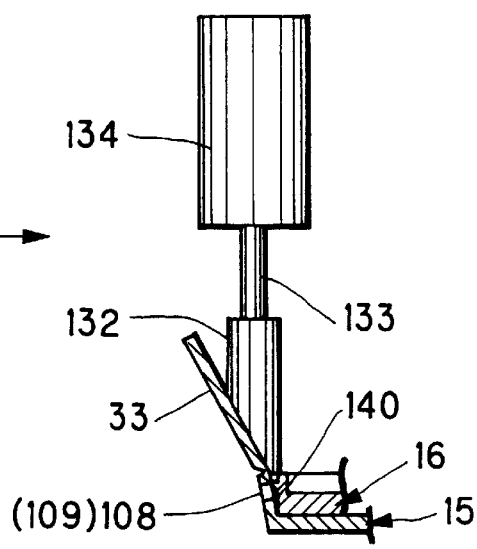
FIG. 20B is an explanatory view in section, illustrating the bottom wall separation of the rear cover separator.

In FIGS. 20A and 20B, the separator rod 132 is disposed on an end of a cylinder rod 133, and has a tapered end. The entirety of a cylinder 134 for the rear cover separator is moved up and down by operation of the cylinder 120 in FIG. 19. A release surface 135 of the separator rod 132 spreads the battery-covering bottom wall 33 of the rear cover 15 in an outward direction, to disengage each retainer claw 140 of the photo film containing unit 16 from the receiver holes 108 and 109 of the rear cover 15.

Figure 21A:
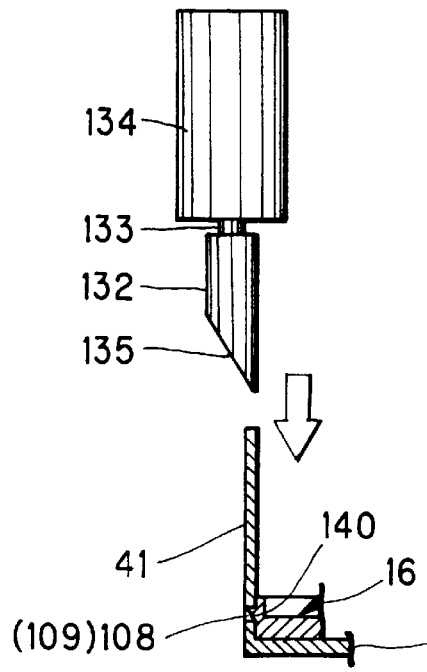
FIGS. 21A and 21B are explanatory views in section, illustrating bottom wall separation of the rear cover separator for a flashless type.
Figure 21B:
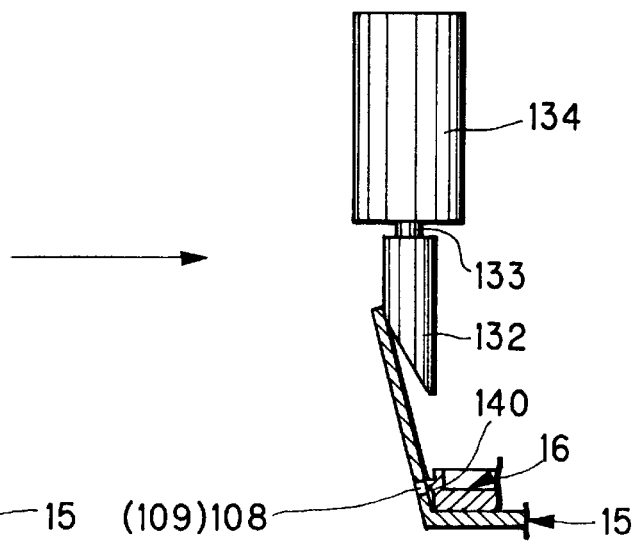

The cylinder rod 133 is moved up and down by operation of the cylinder 134. The separator rod 132 is moved by the cylinder rod 133 between a lower position of FIGS. 20A and 20B and an upper position of FIGS. 21A and 21B. Those positions or orientations are selected according to a selected one of the flash built-in and flashless types. When the housing 3 is the flash built-in type, the battery-covering bottom wall 33 has been widely open. The separator rod 132 must come to a root portion for the battery-covering bottom wall 33 where the battery-covering bottom wall 33 is supported. Thus the separator rod 132 is oriented in the lower position. When the housing 3 is the flashless type, the bottom wall 41 in FIGS. 21A and 21B remains closed without opening in the bottom of the housing. The separator rod 132 only must come to a distal end of the bottom wall 41. Thus the separator rod 132 is oriented in the upper position.

After the separator rod 132 is set to a position associated with one of the types by the cylinder 134, the separator rod 132 is lowered by the operation of the cylinder 120 of the second separator mechanism. The separator rod 132 spreads the battery-covering bottom wall 33 of FIG. 20B or the bottom wall 41 of FIG. 21B, to disengage the receiver holes 108 and 109 of the rear cover 15 respectively from the retainer claws 140 of the photo film containing unit 16. Finally the rear cover 15 is separated from the main body 40 by the disengagement.

The main body 40 from which the various elements are removed is conveyed to the next station, then exited from the disassembly line 50, transferred to a station of the main body inspection 62, and inspected. Then the frame counter mechanism in the exposure unit 18 and the shutter closing mechanism 37 in the photo film containing unit 16 are reset to their initial positions to be reused. Note that the chuck 121 in FIG. 19 may be used to exit the main body 40 in the station of the rear cover separation 60.

In removing the main body 40 from the disassembly line 50, the winder wheel 9 falls easily. For the purpose of ejecting the winder wheel 9, the main body 40 is conveyed while retained by the chuck 121, which is then released from retaining the main body 40 upon placement of the main body 40 on a conveyor. Thus the winder wheel 9 is naturally separated from the main body 40 to exit. The winder wheel 9 after the ejection is recycled and reused. The rear cover 15 remains in the disassembly line 50, but ejected in a station of the rear cover ejection 61 after the ejection of the main body 40, to be recycled and reused.

In the present invention, the above-described disassembling devices or units may be modified for the purpose of disassembly of any parts of each lens-fitted photo film unit. Components of the entirety of the disassembling apparatus above may be combined with known structures of disassembling devices or units for parts of the lens-fitted photo film unit. In the above embodiment, the lens-fitted photo film unit is the type of which the exposure unit 18 is removable from the photo film containing unit 16. However the main body may be an inseparable unit which may be pre-loaded with photo film and may have the taking lens and the shutter, as a single component including the exposure unit 18 and the photo film containing unit 16.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disassembling method for a lens-fitted photo film unit, said lens-fitted photo film unit including a main body, having a cassette holder chamber, a roll holder chamber and an exposure aperture, said cassette holder chamber containing a cassette, said roll holder chamber containing a roll of photo film drawn from said cassette, said exposure aperture being formed between said cassette holder chamber and said roll holder chamber for taking an exposure on said photo film, a front cover for covering at least a front of said main body, a rear cover for covering at least a rear of said main body, a first retainer mechanism, having a retainer claw and a receiver portion engaged with each other, for connecting rear walls of said main body and said rear cover, and an opening, formed in said rear cover, for uncovering at least a portion of said retainer claw or said receiver portion, said disassembling method comprising steps of:
   inserting a release member into said opening by setting said lens-fitted photo film unit in a cover separating station with said rear cover directed downwards, said release member being disposed to protrude upwards in said cover separating station;
   shifting said release member relative to said opening, to disengage said retainer claw from said receiver portion by flexing said retainer claw away therefrom; and
   after disengaging said retainer claw from said receiver portion, moving one of said rear cover and said main body away from a remainder thereof.

2. A disassembling method as defined in claim 1, wherein said lens-fitted photo film unit further includes:
   first and second walls, of which one is disposed on said rear cover, and a remainder is disposed on said main body, said first wall being uncovered externally, said second wall being positioned inside said first wall;
   a second retainer mechanism, having a retainer claw and a receiver portion engaged with each other, for connecting said first and second walls with each other;
   further comprising a step of inserting a release mechanism between said first and second walls, said release mechanism disengaging said second retainer mechanism by spreading said first wall outwards, to disconnect said first and second walls from each other.

3. A disassembling method as defined in claim 2, wherein said first wall is an end wall and/or a bottom wall formed with said rear cover to protrude forwards, and said second wall is an end wall and/or a bottom wall of said main body.

4. A disassembling method as defined in claim 1, wherein said lens-fitted photo film unit further includes a first part held by connection of said front cover and said main body; further comprising steps of:
   separating said front cover and said main body from each other; and
   sucking said first part set free upon separating said front cover and said main body, to prevent said first part from scattering.

5. A disassembling method as defined in claim 4, wherein said first part is a bottom lid, disposed on bottom of said cassette holder chamber, uncovered externally, and opened after said lens-fitted photo film unit is used, for removal of said cassette.

6. A disassembling method as defined in claim 1, wherein said lens-fitted photo film unit further includes:
   a flash unit, secured between said main body and said front cover in a removable manner, for emitting flash light;
   a battery for supplying said flash unit with power;
   further comprising steps of:
   separating said front cover from said main body and said flash unit; and
   after separating said front cover, separating said battery from said flash unit, subsequently said rear cover being separated from said main body.

7. A disassembling method as defined in claim 6, wherein said flash built-in type includes a first bottom wall, formed with said rear cover, positioned outside a bottom of said main body and said battery, and partially flexible; and
   wherein after the steps of separating said front cover, spreading said first bottom wall outwards to form a space, the disassembling method includes the steps of:
   inserting a battery separator into said space; and
   ejecting said battery from said flash unit by capturing said battery in said battery separator.

8. A disassembling apparatus for a lens-fitted photo film unit, said lens-fitted photo film unit including a main body, having a cassette holder chamber, a roll holder chamber and an exposure aperture, said cassette holder chamber containing a cassette, said roll holder chamber containing a roll of photo film drawn from said cassette, said exposure aperture being formed between said cassette holder chamber and said roll holder chamber for taking an exposure on said photo film, a front cover for covering at least a front of said main body, a rear cover for covering at least a rear of said main body, a first retainer mechanism, having a retainer claw and a receiver portion engaged with each other, for connecting rear walls of said main body and said rear cover, and an opening, formed in said rear cover, for uncovering at least a portion of said retainer claw or said receiver portion, said disassembling apparatus comprising:
   a cover separating station;
   a release member, disposed to protrude upwards in said cover separating station, and inserted into said opening by setting said lens-fitted photo film unit in said cover separating station with said rear cover directed downwards;

a release shifter for shifting said release member relative to said opening, to disengage said retainer claw from said receiver portion by flexing said retainer claw away therefrom; and a part shifter for moving one of said rear cover and said main body away from a remainder thereof after disengaging said retainer claw from said receiver portion.

9. A disassembling apparatus as defined in claim 8, wherein said lens-fitted photo film unit further includes:

first and second walls, of which one is disposed on said rear cover, and a remainder is disposed on said main body, said first wall being uncovered externally, said second wall being positioned inside said first wall;

a second retainer mechanism, having a retainer claw and a receiver portion engaged with each other, for connecting said first and second walls with each other;

further comprising a release mechanism, inserted between said first and second walls, for disengaging said second retainer mechanism by spreading said first wall outwards, to disconnect said first and second walls from each other.

10. A disassembling apparatus as defined in claim 9, wherein said first wall is an end wall and/or a bottom wall formed with said rear cover to protrude forwards, and said second wall is an end wall and/or a bottom wall of said main body.

11. A disassembling apparatus as defined in claim 10, wherein said release mechanism includes:

a second release member inserted between said end wall of said rear cover and said end wall of said main body; and a third release member inserted between said bottom wall of said rear cover and said bottom wall of said main body.

12. A disassembling apparatus as defined in claim 8, wherein said lens-fitted photo film unit further includes a first part held by connection of said front cover and said main body;

further comprising:

a front cover separator for separating said front cover and said main body from each other; and a sucker for sucking said first part set free upon separating said front cover and said main body, to prevent said first part from scattering.

13. A disassembling apparatus as defined in claim 12, wherein said first part is a bottom lid, disposed on a bottom of said cassette holder chamber, uncovered externally, and opened after said lens-fitted photo film unit is used, for removal of said cassette.

14. A disassembling apparatus as defined in claim 13, wherein said lens-fitted photo film unit further includes a second retainer mechanism, having a retainer claw and a receiver portion engaged with each other, for connecting said front cover and said main body with each other; and said front cover separator disengages said second retainer mechanism by at least partial deformation, to disconnect said front cover and said main body from each other.

15. A disassembling apparatus as defined in claim 8, wherein said lens-fitted photo film unit further includes:

a flash unit, secured between said main body and said front cover in a removable manner, for emitting flash light;

a battery for supplying said flash unit with power;

further comprising:

a front cover separator for separating said front cover from said main body and said flash unit; and a battery separator for separating said battery from said flash unit after separating said front cover, subsequently said rear cover being separated from said main body.

16. A disassembling apparatus as defined in claim 15, wherein said flash built-in type includes a first bottom wall, formed with said rear cover, positioned outside a bottom of said main body and said battery, and partially flexible; and further comprising:

a spreader for spreading said first bottom wall outwards after separating said front cover, to form a space, said battery separator being inserted into said space, and ejecting said battery from said flash unit by capturing said battery.

17. A disassembling method for a lens-fitted photo film unit, said lens-fitted photo film unit being pre-loaded with photo film, and including at least a rear cover and a main body, a first wall disposed on said rear cover and uncovered externally, a second wall disposed on said main body and positioned inside said first wall, a retainer mechanism, having a retainer claw and a receiver portion engaged with each other, for connecting said first and second walls with each other, said disassembling method comprising a step of:

inserting a release mechanism between said first and second walls, said release mechanism disengaging said retainer mechanism by spreading said first wall outwards, to disconnect said first and second walls from each other.

18. A disassembling method as defined in claim 17, wherein said main body is pre-loaded with said photo film, and said rear cover covers at least a rear of said main body;

said first wall is an end wall and/or a bottom wall formed with said rear cover to protrude forwards, and said second wall is an end wall and/or a bottom wall of said main body.

19. A disassembling apparatus for a lens-fitted photo film unit, said lens-fitted photo film unit being pre-loaded with photo film, and including at least a rear cover and a main body, a first wall disposed on said rear cover and uncovered externally, a second wall disposed on said main body and positioned inside said first wall, a retainer mechanism, having a retainer claw and a receiver portion engaged with each other, for connecting said first and second walls with each other, said disassembling apparatus comprising:

a release mechanism, inserted between said first and second walls, for disengaging said retainer mechanism by spreading said first wall outwards, to disconnect said first and second walls from each other.

20. A disassembling apparatus as defined in claim 19, wherein said main body is pre-loaded with said photo film, and said rear cover covers at least a rear of said main body;

said first wall is an end wall and/or a bottom wall formed with said rear cover to protrude forwards, and said second wall is an end wall and/or a bottom wall of said main body.

21. A disassembling apparatus for a lens-fitted photo film unit, said lens-fitted photo film unit being pre-loaded with photo film, and including at least first, second and third parts, a retainer mechanism, having a retainer claw and a receiver portion engaged with each other, for connecting said first and second parts with each other, said third part being held by connection of said first and second parts, said disassembling apparatus comprising:

a separator for disconnecting said first and second parts from each other by disengaging said retainer mechanism; and a sucker for sucking said third part set free upon disconnecting said first and second parts, to prevent said third part from scattering.

22. A disassembling apparatus as defined in claim 21, wherein said first part is a main body, having a cassette holder chamber, a roll holder chamber and an exposure aperture, said cassette holder chamber containing a cassette, said roll holder chamber containing a roll of said photo film drawn from said cassette, said exposure aperture being formed between said cassette holder chamber and said roll holder chamber for taking an exposure on said photo film;

said second part is a front cover for covering at least a front of said main body; and said third part is a bottom lid, disposed on a bottom of said cassette holder chamber, uncovered externally, and opened after said lens-fitted photo film unit is used, for removal of said cassette.

23. A disassembling method for a lens-fitted photo film unit, said lens-fitted photo film unit being pre-loaded with photo film, and including at least first, second and third parts, a retainer mechanism, having a retainer claw and a receiver portion engaged with each other, for connecting said first and second parts with each other, said third part being held by connection of said first and second parts, said disassembling method comprising steps of:

disconnecting said first and second parts from each other by disengaging said retainer mechanism; and sucking said third part set free upon disconnecting said first and second parts, to prevent said third part from scattering.

24. A disassembling method for a lens-fitted photo film unit, said lens-fitted photo film unit includes a main body pre-loaded with photo film, a flash unit, secured to said main body in a removable manner, supplied with power with a battery, for emitting flash light, and first and second outer covers for covering said main body and said flash unit therebetween, said disassembling method comprising steps of:

separating said first outer cover from said main body and said flash unit;

after separating said first outer cover, spreading a portion of said second outer cover outwards to form a space;

inserting a battery separator into said space; and ejecting said battery from said flash unit by capturing said battery in said battery separator.

25. A disassembling method as defined in claim 24, wherein said portion of said second outer cover is a bottom wall, positioned outside a bottom of said main body and said battery, partially flexible, and adapted to separation of said battery.

26. A disassembling method as defined in claim 25, wherein said first outer cover is a front covers covering a front of said main body and said flash unit, and said second outer cover is a rear cover for covering a rear of said main body and said flash unit.

27. A disassembling method as defined in claim 25, wherein said battery separator magnetically attract said battery.

28. A disassembling method as defined in claim 25, further comprising steps of:

after ejecting said battery, separating said flash unit from said main body; and after separating said flash unit, separating said second outer cover from said main body.

29. A disassembling method for a lens-fitted photo film unit, said lens-fitted photo film unit including a main body pre-loaded with photo film, said method comprising the step of:

discerning which of said flash built-in type and said flashless type said lens-fitted photo film unit is; and if said lens-fitted photo film unit is a flash built-in type, said flash built-in type having a flash unit secured to said main body in a removable manner and supplied with power with a battery for emitting flash light, and first and second outer covers for covering said main body and said flash unit therebetween, said disassembling method includes the steps of:

separating said first outer cover from said main body and said flash unit;

spreading a portion of said second outer cover outwards to form a space; and ejecting said battery from said flash unit by capturing said battery in said battery separator;

wherein said portion of said second outer cover is a bottom wall, positioned outside a bottom of said main body and said battery, partially flexible, and adapted to separation of said battery; and if said lens-fitted photo film unit is said flashless type, said flashless type including a second bottom wall, formed with said second outer cover, positioned outside a bottom of said main body, and substantially entirely rigid; said disassembling method includes the step of;

inhibiting said second bottom wall from being spread outwards.

30. A disassembling apparatus for a lens-fitted photo film unit, said lens-fitted photo film unit includes a main body pre-loaded with photo film, a flash unit, secured to said main body in a removable manner, supplied with power with a battery, for emitting flash light, and first and second outer covers for covering said main body and said flash unit therebetween, said disassembling apparatus comprising:

a cover separator for separating said first outer cover from said main body and said flash unit;

a spreader for spreading a portion of said second outer cover outwards after separating said first outer cover, to form a space; and a battery separator, inserted into said space, for ejecting said battery from said flash unit by capturing said battery in said battery separator.

31. A disassembling apparatus as defined in claim 30, wherein said portion of said second outer cover is a bottom wall, positioned outside a bottom of said main body and said battery, partially flexible, and adapted to separation of said battery.

32. A disassembling apparatus as defined in claim 31, wherein said first outer cover is a front cover for covering a front of said main body and said flash unit, and said second outer cover is a rear cover for covering a rear of said main body and said flash unit.

33. A disassembling apparatus as defined in claim 31, wherein said battery separator magnetically attracts said battery.

34. A disassembling apparatus as defined in claim 31, further comprising:

a flash separator for separating said flash unit from said main body after ejecting said battery; and a second cover separator for separating said second outer cover from said main body after separating said flash unit.

35. A disassembling apparatus, for a flashless type lens-fitted photo film unit, said flashless type lens-fitted photo film unit including a main body pre-loaded with photo film, and first and second outer covers for covering said main body, said disassembling apparatus comprising:

a cover separator for separating said first outer cover from said main body;

a spreader for spreading a portion of said second outer cover outwards after separating said first outer cover;

wherein a portion of said second outer cover is a bottom wall positioned outside a bottom of said main body; and wherein said flashless type lens-fitted photo film unit includes a second bottom wall, formed with said second outer cover, positioned outside a bottom of said main body, and substantially entirely rigid; and a shifter mechanism for shifting said spreader, to inhibit said spreader from contacting said second bottom wall.

36. A disassembling apparatus as defined in claim 35, wherein said lens-fitted photo film unit further includes a retainer mechanism, having a retainer claw and a receiver portion engaged with each other, for connecting said bottom wall or second bottom wall and said main body with each other;

further comprising a release mechanism, inserted between said bottom wall or second bottom wall and said main body, for disengaging said retainer mechanism by spreading said bottom wall or second bottom wall outwards, to disconnect said bottom wall or second bottom wall and said main body from each other.

37. A disassembling apparatus as defined in claim 36, wherein each of said bottom wall and second bottom wall has first and second edges, and said retainer mechanism is disposed close to said first edge;

further comprising a setter mechanism for setting said release mechanism in a first orientation if said lens-fitted photo film unit is said flash built-in type, and for setting said release mechanism in a second orientation if said lens-fitted photo film unit is said flashless type, said release mechanism, when set in said first orientation, pressing a vicinity of said first edge on said bottom wall, and when set in said second orientation, pressing said second edge on said second bottom wall.

38. A disassembling method as defined in claim 1, wherein said lens-fitted photo film unit is a flashless type, said flashless type including a first bottom wall and a second bottom wall, formed with said rear cover, positioned outside a bottom of said main body, and substantially entirely rigid; and wherein after the step of separating said front cover, the method further comprises the step of:

inhibiting said second bottom wall from being spread outwards.

39. A disassembling apparatus as defined in claim 8, wherein said lens-fitted photo film unit is a flashless type, said flashless type including a first bottom wall and a second bottom wall, formed with said rear cover, positioned outside a bottom of said main body, and substantially entirely rigid; said apparatus further comprising:

a spreader for spreading said first bottom wall outwards after separating said front cover; and a shifter mechanism, actuated if said lens-fitted photo film unit is said flashless type, for shifting said spreader to inhibit said spreader from contacting said second bottom wall.

40. A disassembling method for a lens-fitted photo film unit, said lens-fitted photo film unit including a main body pre-loaded with photo film, said method comprising the step of:

discerning which of said flash built-in type and said flashless type said lens-fitted photo film unit is, prior to disassembly.

* * * * *